US011392476B2

(12) United States Patent
Jin et al.

(10) Patent No.: US 11,392,476 B2
(45) Date of Patent: Jul. 19, 2022

(54) CALCULATING INDIVIDUAL CARBON FOOTPRINTS

(71) Applicant: Advanced New Technologies Co., Ltd., Grand Cayman (KY)

(72) Inventors: Huajing Jin, Hangzhou (CN); Di Xu, Hangzhou (CN); Zhenhua Li, Hangzhou (CN); Xue Bai, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 120 days.

(21) Appl. No.: 15/684,603

(22) Filed: Aug. 23, 2017

(65) Prior Publication Data

US 2018/0060204 A1  Mar. 1, 2018

(30) Foreign Application Priority Data

Aug. 24, 2016  (CN) .......................... 2016 1 0717756

(51) Int. Cl.
*G06F 11/34* (2006.01)
*G06F 11/30* (2006.01)
*G06Q 10/00* (2012.01)

(52) U.S. Cl.
CPC ...... *G06F 11/3409* (2013.01); *G06F 11/3013* (2013.01); *G06F 11/3058* (2013.01);
(Continued)

(58) Field of Classification Search
CPC ............. G06F 11/3409; G06F 11/3013; G06F 11/3058
See application file for complete search history.

(56) References Cited

U.S. PATENT DOCUMENTS

| 8,527,335 B1 | 9/2013 | MacArthur |
| 8,949,028 B1 | 2/2015 | Klampfl et al. |

(Continued)

FOREIGN PATENT DOCUMENTS

| CN | 2010097577 | 4/2010 |
| CN | 101832795 | 9/2010 |

(Continued)

OTHER PUBLICATIONS

International Search Report and Written Opinion of the International Searching Authority issued in International Application No. PCT/US2017/048405 dated Nov. 7, 2017; 8 pages.

(Continued)

*Primary Examiner* — Lisa E Peters
(74) *Attorney, Agent, or Firm* — Fish & Richardson P.C.

(57) ABSTRACT

Behavior data associated with a user is obtained. The behavior data is generated when the user uses an Internet service and includes a user identification and identification information indicating the Internet service. At least one predefined carbon-saving quantity quantization algorithm is determined based on the identification information related to the Internet service. A carbon-saving quantity associated with the user is calculated based on the obtained behavior data and the determined at least one predefined carbon-saving quantity quantization algorithm. Based on the calculated carbon-saving quantity associated with the user and the user identification, user data is processed. The user data is related to the carbon-saving quantity associated with the user.

22 Claims, 12 Drawing Sheets

(52) U.S. Cl.
CPC .......... *G06F 11/3438* (2013.01); *G06Q 10/00* (2013.01); *G06F 2219/10* (2013.01); *Y02D 10/00* (2018.01); *Y02P 90/84* (2015.11); *Y02P 90/845* (2015.11)

(56) References Cited

U.S. PATENT DOCUMENTS

| | | | |
|---|---|---|---|
| 10,572,364 | B2 | 2/2020 | Jin et al. |
| 2003/0004781 | A1 | 1/2003 | Mallon |
| 2003/0040964 | A1 | 2/2003 | Lacek |
| 2003/0200144 | A1 | 10/2003 | Antonucci et al. |
| 2009/0171975 | A1 | 7/2009 | McConnell et al. |
| 2009/0171992 | A1 | 7/2009 | Roberts |
| 2009/0210295 | A1* | 8/2009 | Edholm .......... G06Q 10/06393 705/7.39 |
| 2009/0234704 | A1 | 9/2009 | Roher et al. |
| 2009/0292617 | A1 | 11/2009 | Sperling et al. |
| 2009/0307024 | A1 | 12/2009 | Edholm et al. |
| 2010/0025094 | A1 | 2/2010 | Tamiya |
| 2010/0042453 | A1 | 2/2010 | Scaramellino et al. |
| 2010/0100417 | A1 | 4/2010 | Nussel et al. |
| 2010/0179856 | A1 | 7/2010 | Paretti et al. |
| 2010/0250356 | A1 | 9/2010 | Gillenson et al. |
| 2010/0257094 | A1* | 10/2010 | Kumar ................ H04L 67/2838 705/40 |
| 2011/0145438 | A1 | 6/2011 | Sakamoto |
| 2011/0184574 | A1 | 7/2011 | Le Roux et al. |
| 2011/0184784 | A1 | 7/2011 | Rudow et al. |
| 2011/0213690 | A1 | 9/2011 | Ghosh et al. |
| 2012/0041767 | A1 | 2/2012 | Hoffman et al. |
| 2012/0054024 | A1 | 3/2012 | Polizzotto |
| 2012/0095897 | A1 | 4/2012 | Barrow |
| 2012/0130789 | A1* | 5/2012 | Postrel ................... G06Q 40/04 705/14.23 |
| 2012/0203596 | A1 | 8/2012 | Guthridge et al. |
| 2012/0271670 | A1 | 10/2012 | Zaloom |
| 2012/0296799 | A1 | 11/2012 | Playfair et al. |
| 2013/0054359 | A1 | 2/2013 | Ross et al. |
| 2013/0073366 | A1 | 3/2013 | Heath et al. |
| 2013/0073400 | A1 | 3/2013 | Heath et al. |
| 2013/0159218 | A1 | 6/2013 | Kijima et al. |
| 2013/0191313 | A1 | 7/2013 | Meinrenken et al. |
| 2013/0246133 | A1* | 9/2013 | Dembo ................... G06Q 10/06 705/14.1 |
| 2014/0114867 | A1 | 4/2014 | Volkmann et al. |
| 2014/0155148 | A1 | 6/2014 | Wrightsil et al. |
| 2014/0207299 | A1 | 7/2014 | Reichmuth et al. |
| 2014/0303935 | A1 | 10/2014 | Kamel et al. |
| 2015/0058324 | A1 | 2/2015 | Kauwe |
| 2015/0081529 | A1 | 3/2015 | Lee et al. |
| 2015/0127391 | A1 | 5/2015 | Bellowe |
| 2015/0134550 | A1 | 5/2015 | Sroufe |
| 2015/0235232 | A1 | 8/2015 | Meyer et al. |
| 2015/0324834 | A1* | 11/2015 | Postrel ............... G06Q 30/0208 705/14.27 |
| 2015/0326451 | A1 | 11/2015 | Rao et al. |
| 2016/0034910 | A1 | 2/2016 | Davis |
| 2016/0155130 | A1 | 6/2016 | Kale |
| 2016/0238740 | A1 | 8/2016 | Yu et al. |
| 2019/0213097 | A1 | 7/2019 | Jin et al. |

FOREIGN PATENT DOCUMENTS

| | | |
|---|---|---|
| CN | 101859419 | 10/2010 |
| CN | 201731892 | 2/2011 |
| CN | 201919058 | 8/2011 |
| CN | 102985890 | 3/2013 |
| CN | 103314400 | 9/2013 |
| CN | 103793772 | 5/2014 |
| CN | 103793773 | 5/2014 |
| CN | 103793774 | 5/2014 |
| CN | 103793776 | 5/2014 |
| CN | 103810509 | 5/2014 |
| CN | 104008309 | 8/2014 |
| CN | 104008487 | 8/2014 |
| CN | 104239695 | 12/2014 |
| CN | 104268817 | 1/2015 |
| CN | 104598742 | 5/2015 |
| CN | 104766237 | 7/2015 |
| CN | 104794640 | 7/2015 |
| CN | 104813345 | 7/2015 |
| CN | 105468608 A | 4/2016 |
| CN | 105825461 | 8/2016 |
| JP | 2002352335 | 12/2002 |
| JP | 2004341788 | 12/2004 |
| JP | 2005204916 | 8/2005 |
| JP | 2010097370 | 4/2010 |
| JP | 2011145903 | 7/2011 |
| JP | 2011242935 | 12/2011 |
| KR | 20110026907 A | 3/2011 |
| KR | 20120023925 | 3/2012 |
| KR | 20140124060 | 10/2014 |
| TW | 201128379 | 8/2011 |
| WO | WO 2010075458 | 8/2010 |
| WO | WO 2018039445 | 3/2018 |

OTHER PUBLICATIONS

United Nation Environment Programme [online], "Chinese initiative Ant Forest wins UN Champions of the Earth award," Sep. 2019, [retrieved on Oct. 1, 2019], retrieved from: URL<https://www.unenvironment.org/news-and-stories/press-release/chinese-initiative-ant-forest-wins-un-champions-earth-award>, 4 pages.

Extended European Search Report in European Application No. 17844409.7, dated Jul. 12, 2019, 10 pages.

Carbon Trust, "Carbon Footprinting, The Next Step to Reducing Your Emissions"; Management Guide; Mar. 2012; 23 pages; UK.

EPA, "Carbon Footprint Calculator"; https://www3.epa.gov/carbon-footprint-calculator/; Jul. 14, 2016.

The Nature Conservancy, "Free Carbon Footprint Calculator"; http://www.nature.org/greenliving/carboncalculator/index.htm; Powered by the CoolClimate Network at the University of California at Berkeley; 2017.

Carbon Footprint, "Carbon Calculator"; http://www.carbonfootprint.com/calculator.aspx.

Yang et al; "The Household Carbon Emission Analysis Under Individual Consumer Behavior"; Department of Urban & Region Planning, Nanjing University;, Nanjing Jiangsu; The Center of Department of Environmental Protection Missionary, Beijing; May 2010.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Preliminary Report on Patentability in International Application No. PCT/US2017/048405, dated Mar. 7, 2019, 7 pages.

Russian Official Action in Russian Application No. 2019108295, dated Nov. 5, 2019, 11 pages (with English translation).

"Analysis of Existing Environmental Footprint Methodologies for Products and Organizations: Recommendations, Rationale, and Alignment" by the Institute for Environment and Sustainability of the Joint Research Centre of the European Commission, 2011, retrieved on Oct. 8, 2021, retrieved from URL< http://ec.europa.eu/environment/eussd/pdf/Deliverable.pdf>, 142 pages.

Environmental management—Life cycle assessment-Requirements and guidelines, DIN EN ISO 14044 Standard promulgated by the Deutsches Institutfur Normung, Jul. 2006, 62 pages (with English translation).

hzdaily.hangzhou.com.cn [online], "Mobile phone "point" out of 5.73 million trees Guangdong, Zhejiang, Jiangsu people "planting trees" the most," Jun. 2016, retrieved on May 10, 2021, retrieved from URL<https://hzdaily.hangzhou.com.cn/hzrb/html/2016-06/15/content_2287936.htm>, 2 pages (with machine English translation).

news.mydrivers.com [online], "Alipay-style low-carbon living 450 million people to reduce carbon dioxide emissions a total of 573,000

(56) References Cited

OTHER PUBLICATIONS tons,", Jun. 2016, retrieved on May 10, 2021, retreived from URL<https://news.mydrivers.com/1/486/486770.htm>, 8 pages (with machine English translation).

qqtn.com [online], "Zero Carbon Pie official download," May 2016, retrieved on May 10, 2021, retrieved from URL<https://www.qqtn.com/azsoft/116064.html>, 4 pages (with machine English translation).

Frontier Subjects of Environmental Economics, 1st ed., Xu (ed)., Mar. 2014, 204-05, 8 pages (with English translation).

Lin, "Identify predictors of university students' continuance intention to use online carbon footprint calculator," Sep. 2016, Behaviour & Information Technology, 36:3, pp. 294-311.

Wang et al., "A Survey on Personal Data Cloud," The Scientific World Journal, Aug. 2014, 13 pages.

Ge, "Low-carbon life starts with online payment," China High-tech Industry Herald, Jun. 14, 2010, 2 pages (with machine translation).

Qi et al., Research On Ecological Community Planning Strategy Based On Low Carbon Concept, Heilongjiang Engineering Technology, 5 pages (with machine translation).

\* cited by examiner

CALCULATING INDIVIDUAL CARBON FOOTPRINTS

CROSS REFERENCE TO RELATED APPLICATIONS

This application claims priority to Chinese Application No. 201610717756.7, filed on Aug. 24, 2016, the entire contents of which are hereby incorporated by reference.

TECHNICAL FIELD

The present disclosure relates to computer-implemented methods, software, and systems for calculating individual carbon footprints.

BACKGROUND

Various human activities generate carbon emissions (such as, greenhouse gases) that can have negative effects on the Earth's environment. For example, driving a gasoline-powered car or operating a thermal power station generates carbon emissions. To control carbon emissions, it is important for an individual to be aware of their measured carbon footprint based on daily behaviors.

SUMMARY

The present disclosure describes methods and systems, including computer-implemented methods, computer program products, and computer systems for calculating individual carbon footprints, and particularly for calculating how many carbon footprints can be saved (that is, a carbon-saving quantity) from an individual engaging in environment-friendly behaviors.

In an implementation, behavior data associated with a user is obtained. The behavior data is generated when the user uses an Internet service and includes a user identification and identification information indicating the Internet service. At least one predefined carbon-saving quantity quantization algorithm is determined based on the identification information related to the Internet service. A carbon-saving quantity associated with the user is calculated based on the obtained behavior data and the determined at least one predefined carbon-saving quantity quantization algorithm. Based on the calculated carbon-saving quantity associated with the user and the user identification, user data is processed. The user data is related to the carbon-saving quantity associated with the user.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/instructions stored on the non-transitory, computer-readable medium.

The subject matter described in this specification can be implemented in particular implementations, so as to realize one or more of the following advantages. First, the described approach can be used to make individual people aware of their associated carbon footprints, carbon-saving quantities, or both from their daily behaviors. For example, fragmented behavior information associated with a person (a user) within a particular period of time (for example, a day, a month, or a year) can be aggregated. Based on the aggregated behavior data and in combination with a corresponding carbon-saving quantity quantization algorithm, a measurement of carbon footprints reduced by the user (that is, a carbon-saving quantity) can be calculated and provided to the user. Second, a service provider can provide a particular service, such as a point accumulation, an account upgrade, or other service, for the user based on the carbon-saving quantity associated with the user. The particular service can also provide incentives to the user to encourage reduction of carbon footprints by, for example, adopting more environmentally-friendly behaviors. Other advantages will be apparent to those of ordinary skill in the art.

The details of one or more implementations of the subject matter of this specification are set forth in the detailed description, the claims, and the accompanying drawings. Other features, aspects, and advantages of the subject matter will become apparent from the detailed description, the claims, and the accompanying drawings.

DESCRIPTION OF DRAWINGS

Like reference numbers and designations in the various drawings indicate like elements.

DETAILED DESCRIPTION

The following detailed description describes calculating individual carbon footprints, particularly calculating a carbon-saving quantity associated with a user based on collecting and aggregating fragmented behavior data associated with the user within a particular period of time, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and as such details are within the skill of one of ordinary skill in the art. The present disclosure is not intended to be limited to the described or illustrated implementations, but to be accorded the widest scope consistent with the described principles and features.

Human activities can generate carbon emissions. To reduce carbon emissions, it is important to make people aware of their carbon footprints from their daily behaviors. In addition, incentives can be provided to encourage enterprises or individuals to take initiative to control their carbon emissions by adopting environment-friendly behaviors. For enterprises, since enterprise behaviors, in general, are relatively closely related to the goals of the enterprise, each enterprise can calculate and control its carbon footprints and carbon-saving quantities. However, for individuals, as individual behaviors are often unrelated to each other (that is, fragmented), carbon emissions can be generated from many different unrelated human activities. As a result, it is difficult for individual persons to calculate their associated carbon footprints.

At a high-level, the described approach provides a mechanism to automatically collect and aggregate behavior data associated with a user within a period of time. Based on aggregated behavior data and a particular carbon-saving quantity quantization algorithm, carbon footprints associated with the user, a carbon-saving quantity associated with the user, or a combination of carbon footprints and a carbon-saving quantity associated with the user can be calculated and provided to the user. The carbon-saving quantity associated with the user can be further processed by a service provider to provide a particular service, such as point accumulation or account upgrade, for the user.

Figure 1:
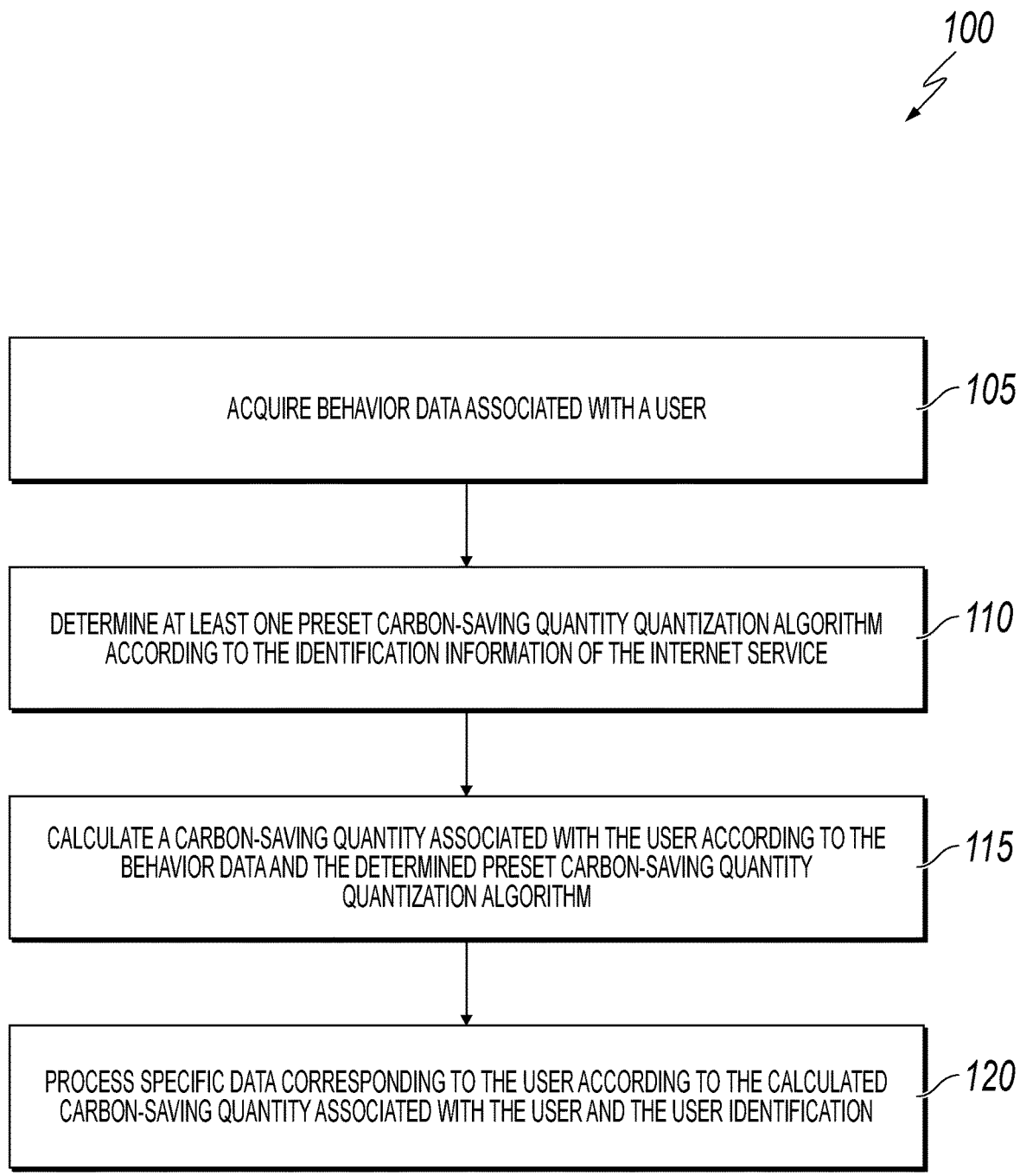
FIG. 1 is a flowchart illustrating an example method for calculating individual carbon footprints, according to an implementation of the present disclosure.

FIG. 1 is a flowchart illustrating an example method 100 for calculating individual carbon footprints, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 105, behavior data associated with a user is acquired. For example, the acquired behavior data can be generated when the user uses an Internet service. In some implementations, the behavior data can include a user identification (such as a user ID or a user account) and identification information that indicates the Internet service used when the behavior data is generated. The Internet service can include, for example, at least one of an Internet-based (or "online") electronic payment service, a reservation service, a ticketing service, a payment service, a health service, or other Internet service consistent with this disclosure. In some implementations, the health service can be a service associated with a mobile phone system or an application for monitoring user movement behavior. In some implementations, the health service can include, for example, at least one of a step-counting service and a distance calculation service. In some implementations, different Internet services can have different identification information, which can include, for example, at least one of a service type identification and a type identification bit in an order number. As a result, a type of an Internet service corresponding to the behavior data can be determined based on the identification information in the behavior data. In some implementations, behavior data from different Internet services can be differentiated based on the identification information included in the behavior data from the different Internet services.

In some implementations, the acquired behavior data can include fragmented behavior data. Each fragment of the behavior data can include a user identification (such as a user ID or a user account) and identification information indicating the Internet service corresponding to the particular fragment of the behavior data. To aggregate the fragmented behavior data, all the fragments of the behavior data are toned to include identification related to the same user in order to correlate the fragments of the behavior data. In some implementations, a user can use different Internet services through different applications or servers when generating behavior data. For example, the user can use an online payment service through a payment application on a mobile computing device and use an online meal-ordering service through a meal-ordering application. In some implementations, a user can use different accounts when using the Internet services. To ensure that the acquired behavior data is associated with the same user, the different accounts (that is, user identifications) related to the same user may be acquired. For example, the user can first input information related to their different accounts to be stored. Then, behavior data associated with an account can be acquired from a corresponding application or server through, for example, an account name of the user. In some implementations, data or combinations of data identifying the user can be used to acquire the behavior data. Note that the previously described method is not limited to acquisition of different accounts related to a same user, but also applicable to acquisition of different accounts related to different users.

In some implementations, after the behavior data is acquired, a field, representing a type of an Internet service, in the behavior data can be determined based on a predefined rule. Based on content in the field, the type of Internet service corresponding to the behavior data can be determined. In some implementations, types of Internet services provided by some applications or servers are relatively fixed. For example, a ticketing website server only provides a ticketing service. If behavior data is acquired from such applications or servers, types of Internet services corresponding to the behavior data can be identified directly based on, for example, at least one of names, domain names, Universal Resource Locators (URLs), and other information associated with the applications or servers.

In some implementations, method 100 can be performed by an application. In some implementations, method 100 can be performed by a server. When performed by an application, the application may be capable of providing various Internet services to the user. In that case and in some implementations, the application can be configured to generate behavior data for the user and to also calculate carbon footprints for the user directly based on the generated behavior data. In other words, by registering an account in the application, behavior data generated by the user through use of various Internet services in the application can be associated with the user's registered account. As a result, the application only needs to acquire behavior data related to the account to calculate, for example, carbon footprints for the user.

However, if the application cannot itself provide an Internet service to the user, the application can initiate a request for acquiring behavior data from a third-party application or a third-party server capable of providing an Internet service. Then, the application may receive the behavior data from the third-party application, or synchronize data with the third-party application to receive the behavior data generated by the third-party application. In that case, the user may input, in the application, different third-party accounts associated with the user, as well as third-party applications or third-party servers corresponding to the different third-party accounts. The application can then associate the third-party accounts with an account registered by the user in the application. For example, to acquire behavior data from a third-party application, the application can determine, based on a third-party account, a third-party application corresponding to the third-party account, and send an acquisition request that carries the third-party account to the third-party application. In response, the third-party application can find behavior data related to the third-party account and return the behavior data to the requesting application. As a result, the application can acquire the user behavior data.

In some implementations, when a third-party application is involved in calculating individual carbon footprints, the application that performs method 100 can register, in advance, with the third-party application. By registering with the third-party application, the application can receive behavior data from the third-party application. In some implementations, when a third-party server is involved in calculating individual carbon footprints, the application that performs method 100 can acquire behavior data from the third-party server through a data transfer protocol that both the application and the third-party server agree upon.

In some implementations, behavior data is generated, by a third-party application or a third-party server, in a common data format. For example, the behavior data can be generated in a two-dimensional table format, a HyperText Markup Language (HTML) format, or an Extensible Markup Language (XML) format. After acquiring the behavior data, the application or server that performs method 100 can read, analyze, or read and analyze the behavior data based on the corresponding data format. In some implementations, for a particular data format, the application that performs method 100 and a third-party application can agree upon a data transmission format (for example, a JavaScript Object Notation (JSON) format). In addition, different methods for analyzing different data formats can be added, in advance, to an Application Programming Interface (API) of the application. In some implementations, the acquired behavior data can be stored locally or remotely. From 105, method 100 proceeds to 110.

At 110, at least one preset carbon-saving quantity quantization algorithm is determined according to the identification information of the Internet service in the acquired behavior data. In some implementations, relationships between Internet services and carbon-saving quantity quantization algorithms are pre-established. Based on a particular Internet service and the pre-established relationships, at least one carbon-saving quantity quantization algorithm can be determined. The at least one carbon-saving quantity quantization algorithm includes, for example, a quantization formula, a quantization model, or a combination of a quantization formula and a quantization model.

In some implementations, behavior data including different identification information from different Internet services can be associated with different carbon-saving quantity quantization algorithms. For example, an electronic payment service can save paper products, and a walking trip can save carbon emissions because a vehicle was not driven (such as a gasoline-powered car). In some implementations, an Internet service can be associated with multiple carbon-saving quantity quantization algorithms (that is, multiple carbon-saving quantity quantization algorithms can be used with one Internet service). For example, when a user uses an online ticketing service, the user can buy a ticket without leaving, for example, the user's home. As a result, carbon emissions caused by a trip to a ticketing site by driving a vehicle can be saved. In addition, buying tickets online can avoid printing paper products, such as tickets, receipts, and reservation lists, during online payment. As a result, carbon emissions caused by the used paper products can be saved. To calculate a carbon-saving quantity associated with the user by using the online ticketing service, both a carbon-saving quantity quantization algorithm associated with trips using a vehicle and a carbon-saving quantity quantization algorithm associated with the use of paper products are used.

In some implementations, the carbon-saving quantity quantization algorithms can include a first preset algorithm and a second preset algorithm. For example, the first preset algorithm can be a carbon-saving quantity quantization algorithm associated with the use of paper products (such as, a carbon-saving quantity quantization algorithm for savings related to avoidance of printing paper bills). The second preset algorithm can be a carbon-saving quantity algorithm associated with use of a vehicle (such as, a carbon-saving quantity quantization algorithm for savings related to walking as opposed to driving).

For the first preset algorithm, a carbon-saving quantity can be calculated based on a carbon emission corresponding to a paper product. For example, the following formula can be used:

$$ER_y = \Sigma_i (F_i \times AD_{i,y}) \times EF_y \times 10^{-6} \quad (1),$$

where $ER_y$ is a carbon-saving quantity (unit: tons of $CO_2$) of a paper bill saved by each online payment in the $y^{th}$ year. In other words, $ER_y$ represents, in essence, a carbon footprint corresponding to a paper bill printed for each offline payment. Since printing of a paper bill can be avoided if the user uses online payment, the value of $ER_y$ can be used as a carbon-saving quantity of a paper bill saved by each online payment. i is a merchant type of offline payment. $F_i$ is a proportion (that is, percentage) of i-type merchants using a point of service (POS) machine for payment. $AD_{i,y}$ is the number of times (unit: times) that the user makes payment offline at the i-type merchants in the $y^{th}$ year. $EF_y$ is a baseline emission factor (unit: g CO2/time) of offline payment in the $y^{th}$ year. In some implementations, $EF_y$ can be determined based on emission intensities of bill paper manufacturers in different regions. For example, Table 1 shows emission intensities of bill paper manufacturers in several provinces in China.

TABLE 1

| | Yunnan | Zhejiang | Shanxi | Other provinces |
|---|---|---|---|---|
| Emission intensities (tons of CO2/ton of paper) | 1.9296 | 2.0072 | 1.8834 | 1.4622 |

In some implementations, since the value of a carbon-saving quantity corresponding to saving of a paper bill in each online payment service (that is, ER) is too small, the carbon-saving quantity is calculated on an annual basis (that is, $ER_y$ as in Equation (1)). In some implementations, a threshold number can be predefined to avoid calculating a carbon-saving quantity each time the online payment service is being used. For example, after using the online payment service by more than the threshold number, a total carbon-saving quantity for using the online payment service the threshold number of times can be calculated.

For the second preset algorithm, a carbon-saving quantity can be calculated based on a carbon emission corresponding to a trip by driving a vehicle to a service location (for example, a bank, a shop, a restaurant). For example, the following formula can be used:

$$P = L \times W; \qquad (2)$$

where L is a geographical distance (unit: miles) between a user location when using an online service and a nearest service location, W is a mean value of carbon footprints generated by driving a vehicle for a mile, and P is the carbon footprints generated by driving the vehicle for the distance L. From 110, method 100 proceeds to 115.

At 115, a carbon-saving quantity associated with the user is calculated according to the behavior data and the determined at least one preset carbon-saving quantity quantization algorithm. For the first preset algorithm, production of paper products can be reduced each time the user uses an online Internet service. As a result, the carbon-saving quantity is related to the number of times that the user uses the online Internet service. In addition, since carbon emission standards are different in different regions, the carbon-saving quantity is also related to the user's geographical location. In some implementations, when the first predefined algorithm is used to calculate a user carbon-saving quantity, at least a number of times that the user uses an Internet service and a user's geographical location when the user uses the Internet service are first determined. Then, the carbon-saving quantity is calculated based on the determined number of times that the user uses the Internet service, the determined geographical position of the user when the user uses the Internet service, and the first predefined algorithm.

For the second preset algorithm, the carbon-saving quantity associated with the user is related to, for example, a number of walking steps or a walking distance associated with the user. In some implementations, when the second predefined algorithm is used to calculate a user carbon-saving quantity, at least a number of walking steps or a walking distance associated with the user is determined. Then, the carbon-saving quantity is calculated based on the determined number of walking steps or walking distance, and the second predefined algorithm.

In some implementations, when the Internet services and the carbon-saving quantity quantization algorithms are in a one-to-one relationship, a single carbon-saving quantity quantization algorithm can be used to calculate a user carbon-saving quantity by using a corresponding Internet service.

In some implementations, when the Internet services and the carbon-saving quantity quantization algorithms are in a one-to-many relationship, multiple carbon-saving quantity quantization algorithms, corresponding to a particular Internet service, can be used to calculate a user carbon-saving quantity by using the particular Internet service.

In some implementations, the acquired behavior data may include redundant or irrelevant data, such as data not required to calculate individual carbon footprints. For example, acquired behavior data for a user using an online ticketing service can include data related to the amount of money the user paid. In some implementations, the acquired behavior data may not be used directly. For example, when a carbon-saving quantity is calculated according to behavior data associated with a user using an online ticketing service, the calculation may require a number of times the user uses the online ticketing service. In some implementations, the behavior data is processed to determine an exact number of times the user uses the online ticketing service. In other implementations, an approximate number of times the user uses the online ticketing service can be used. As a result, before calculating a carbon-saving quantity, data collating operations, such as statistical collection, screening, and removal, can be performed on the acquired behavior data. In some implementations, an application or server that performs method 100 may perform the data collating operations on the behavior data. In some implementations, an application or server that performs method 100 and a behavior data provider can agree upon behavior data required for calculation. As a result, the behavior data provider can perform the data collating operations on behavior data associated with a user before providing the processed behavior data to the application or server.

In some implementations, a quantized value, calculated based on the behavior data and the carbon-saving quantity quantization algorithm, can represent a carbon footprint reduced by a user (that is, a carbon-saving quantity associated with the user). In some implementations, a carbon-saving quantity can be calculated on a predefined cycle period. In some implementations, a carbon-saving quantity can be calculated based on the number of times that the user uses an Internet service. From 115, method 100 proceeds to 120.

At 120, specific user data is processed according to the calculated carbon-saving quantity and the user identification. The specific user data is related to a carbon-saving quantity. In some implementations, after the carbon-saving quantity associated with the user is calculated, data processing operations, such as statistical collection and analysis, can be performed on the carbon-saving quantity within a period of time (for example, a day, a month, or a year). In some implementations, the calculated carbon-saving quantity can be converted into points based on, for example, a predefined conversion rule. The newly converted points can be added to total points associated with the user to obtain an updated total points value. As the value of the total points increase, the carbon-saving quantity associated with the user increases. Accordingly, a service provider can provide different services to the user based on the value of the total points. For example, virtual goods corresponding to the total points can be assigned to the user. In some implementations, the virtual goods have different display states corresponding to differing total point values.

In some implementations, user identification can include a user account. The specific user data can include data, such as carbon-saving points, a carbon-saving level, a carbon-saving badge, and carbon-saving related virtual goods, in the user account. After 120, method 100 stops.

FIGS. 2A-2E are schematic diagrams of methods 200, 210, 220, 230, and 240 for generation of user behavior data in different scenarios, according to an implementation of the present disclosure. Methods 200, 210, 220, 230, and 240 are presented as detailed views of the operations of method 100 described in FIG. 1 in different scenarios. For clarity of presentation, the description that follows generally describes methods 200, 210, 220, 230, and 240 in the context of the other figures in this description. However, it will be understood that methods 200, 210, 220, 230, and 240 may be performed, for example, by any suitable system, environment, software, and hardware, or a combination of systems, environments, software, and hardware, as appropriate. In some implementations, various steps of methods 200, 210, 220, 230, and 240 can be run in parallel, in combination, in loops, or in any order.

Scenario 1: A User Uses an Online Ticketing Service.

In some implementations, the online ticketing service can include at least one of online booking, purchasing, and refunding services for train tickets, plane tickets, ship tickets, movie tickets, admission tickets, and other tickets consistent with this disclosure. Compared to the traditional ticketing service (that is, a user goes to a physical ticketing site to obtain a ticket), the online ticketing service can save the user a trip to the physical ticketing site. If the trip is taken to the physical ticketing site, for example, by driving a vehicle, data related to carbon emissions generated by the trip can be saved. In addition, by using the online ticketing service, paper products (for example, printed paper statements or receipts) used during ticket purchase or refund can be reduced or eliminated.

After the user uses the online ticketing service, a service provider that provides the online ticketing service (for example, a ticketing website) can generate online ticketing data based on the user's online ticketing behavior. The online ticketing data can be used as behavior data for the user in using the online ticketing service. A carbon-saving quantity associated with using the online ticketing service can be calculated based on the behavior data.

The calculation of a carbon-saving quantity can be performed by an application client having a carbon-saving quantity computing function (hereinafter referred to as a computing application), or a server having a carbon-saving quantity computing function. As an example, FIGS. 2A-2E are described with the computing application performing the carbon-saving quantity calculation. In general, the online ticketing service is provided by a ticketing website. The user can use the online ticketing service through an application corresponding to the ticketing website (hereinafter referred to as a ticketing application). Behavior data generated while the user is using the online ticketing service can be generated by a server of the ticketing website (hereinafter referred to as a ticketing server).

Figure 2A:
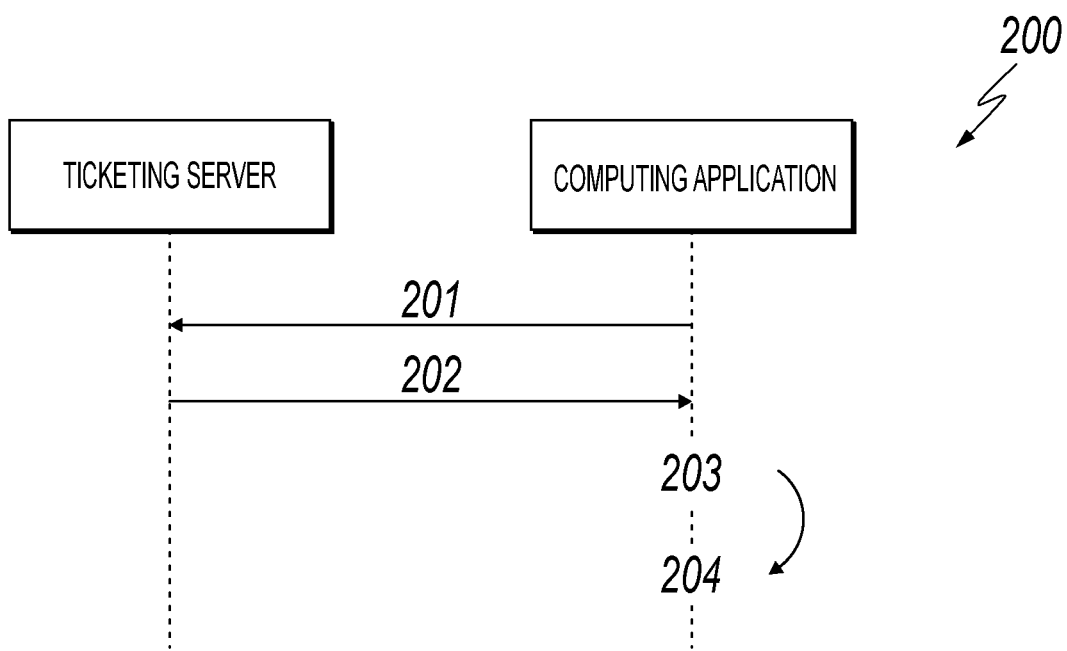
FIGS. 2A-2E are schematic diagrams illustrating methods for generation of user behavior data in different scenarios, according to an implementation of the present disclosure.

FIG. 2A shows an example method 200 of acquiring and calculating a user carbon-saving quantity purchasing a ticket online. In general, when a user purchases a ticket online, the user sends a ticket purchase request to a ticketing server through a corresponding ticketing application. The ticket purchase request can include user information (for example, user's ID card number, name, a ticketing account registered in the ticketing application) and ticket purchase information (for example, type, time, place of a ticket to be purchased). After receiving the ticket purchase request, the ticketing server can issue a ticket according to the online ticket purchase request, generate ticketing data associated with the user, and record the ticketing data as behavior data.

At 201, the computing application sends an acquisition request, including user information to the ticketing server, to acquire ticketing data associated with the user. In some implementations, the acquisition request can include time information indicating ticketing data associated with the user within a predefined cycle period (for example, a day). In some implementations, the acquisition request can include an account registered by the user in the computing application (hereinafter referred to as a computing account) and a ticketing account associated with the user to the ticketing server. The ticketing server, then, can dynamically acquire, according to the ticketing account, ticketing data related to the ticketing account, and actively push, according to the computing account, the ticketing data related to the ticketing account to the computing application. In some implementations, if the computing application itself has an online ticketing service, and the user uses the online ticketing service provided by the computing application, the computing application can acquire ticketing data generated by the computing application. From 201, method 200 proceeds to 202.

At 202, the ticketing server receives the acquisition request, determines ticketing data corresponding to the user information included in the acquisition request, and sends back the determined ticketing data to the computing application. The ticketing data includes at least a user ID, and identification information that reflects a type of the ticketing service. In some implementations, if the acquisition request includes time information, the ticketing server can acquire, according to the time information, ticketing data associated with the user matching the time information. In some implementations, the ticketing server can perform data collating operations on the ticketing data before sending the collated ticketing data to the computing application. For example, the ticketing data stored by the ticketing server may include the amount of money for a purchased ticket, an origin of the purchased ticket, and a destination of the purchased ticket. The ticketing server can remove the amount of money for the purchased ticket, the origin of the purchased ticket, and the destination of the purchased ticket, from the ticketing data and send the processed ticketing data to the computing application. From 202, method 200 proceeds to 203.

At 203, after acquiring the ticketing data from the ticketing server, the computing application determines, according to the user ID included in the ticketing data, that the ticketing data is associated with a user account. In addition, the computing application determines, according to the identification information included in the ticketing data, at least one carbon-saving quantity quantization algorithm for calculating a carbon-saving quantity of the ticketing data. The at least one carbon-saving quantity quantization algorithm can be a carbon-saving quantity quantization algorithm specific to reduction of trips by driving a vehicle, a carbon-saving quantity quantization algorithm specific to savings related to the use of paper products, or a combination of a carbon-saving quantity quantization algorithm specific to reduction of trips by driving a vehicle and a carbon-saving quantity quantization algorithm specific to savings related to the use of paper products. From 203, method 200 proceeds to 204.

At 204, a carbon-saving quantity associated with the user using the online ticketing service is calculated according to the determined carbon-saving quantity quantization algorithm and the acquired ticketing data. In addition, specific user data can be processed according to the calculated carbon-saving quantity associated with the user. In some implementations, the ticketing application includes a locating function capable of determining the user's location information (for example, by using global positioning system (GPS) or WIFI/cellular-triangulation information) when the user sends an online ticketing instruction. The computing application can determine, according to a ticketing order number in the acquired ticketing data, the number of times that the user uses the online ticketing service. The ticketing order number uniquely identifies, for example, one online ticketing service. In addition, the computing application can acquire, through the ticketing application, user location information when the user uses the online ticketing service, and determine $EF_y$ in Equation (1) according to a geographic region corresponding to the user location information.

Accordingly, a carbon-saving quantity specific to savings with respect to use of a printed paper bill each time the user uses the online ticketing service can be calculated. If the user uses the online ticketing service n times in a same geographic region, corresponding to the same $EF_y$, a carbon-saving quantity associated with the user specific to savings related to using printed paper bills can be calculated as $n \times ER_y$. If the user uses the online ticketing service multiple times in different geographic regions, corresponding to different $EF_y$, a carbon-saving quantity associated with the user specific to savings related to using printed paper bills is an accumulation of carbon-saving quantities associated with the user in the different geographic regions.

In some implementations, the computing application can determine, according to the user location information when the user uses the online ticketing service, a ticketing site location (for example, a railway station) closest to the user location. The computing application, then, calculates a distance L between the user location and the ticketing site location, and uses Equation (2) to calculate a carbon-saving quantity specific to avoidance of a trip by driving a vehicle for the distance L. In some implementations, the calculated carbon-saving quantity associated with the user can include both a carbon-saving quantity specific to avoidance of a trip by driving a vehicle, and a carbon-saving quantity specific to savings related to using printed paper bills.

In some implementations, the calculated carbon-saving quantity associated with the user using the online ticketing service can be converted into points. After the user logs into the computing application, the points, indicating reduced carbon footprints by using an online ticketing service, can be presented to the user. After 204, method 200 stops.

Scenario 2: A User Uses an Online Payment Service.

In some implementations, the online payment service can include at least one of a face-to-face online payment service and an online transfer service. Compared to the traditional payment service, the online payment service can reduce consumption of paper products (for example, printed paper bills), and thus can reduce carbon footprints.

After the user uses the online payment service, a service provider that provides the online payment service can generate online payment data based on the user's online payment behavior. The online payment data ca be used as behavior data for the user in using the online payment service. A carbon-saving quantity associated with using the online payment service can be calculated based on the behavior data.

Similar to scenario 1, the calculation of a carbon-saving quantity can be performed by a computing application or a server having a carbon-saving quantity computing function. In some implementations, a service provider capable of providing the online payment service includes a commodity website, a payment platform, and a bank. By taking the payment platform as an example, the user can use the online payment service through an application corresponding to the payment platform (hereinafter referred to as a payment application). Behavior data generated while the user is using the online payment service can be generated by a server of the payment platform (hereinafter referred to as a payment server).

Figure 2B:
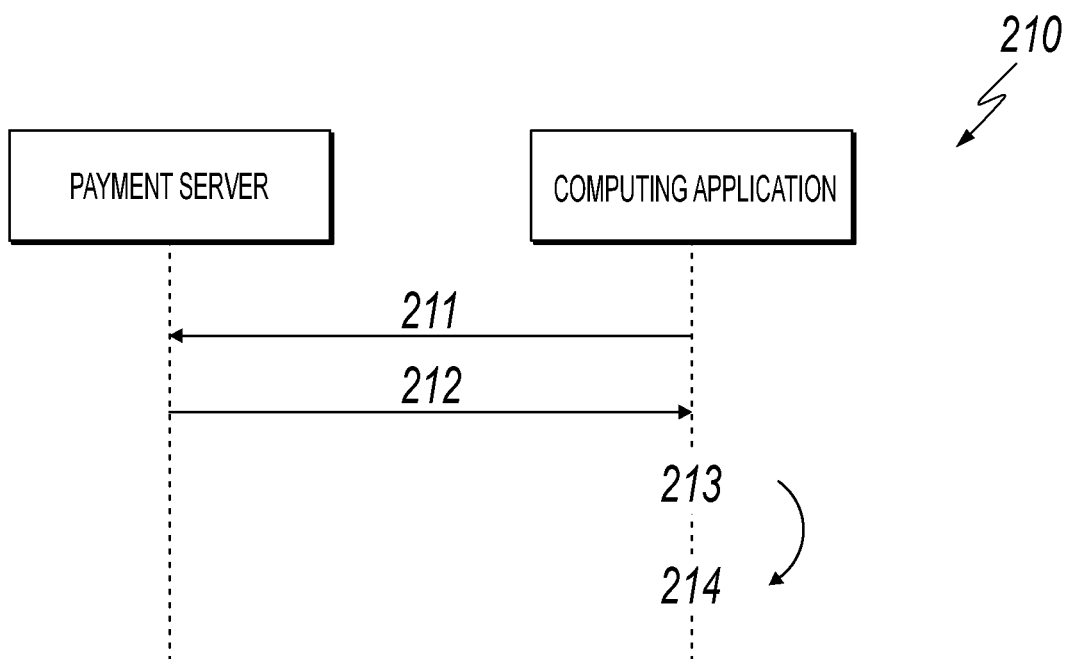

FIG. 2B shows an example method 210 of acquiring and calculating a user carbon-saving quantity making a payment online. In general, when a user makes an online payment, the user sends a payment request to a payment server through a corresponding payment application. The payment request can include user information (for example, a payment account registered by the user on the payment platform), target user information (for example, a target account registered by the target user on the payment platform), and payment information (for example, the amount of payment). After receiving the payment request, the payment server can acquire, according to the received payment request, a fund matching the amount of payment from the payment account associated with the user, assign the fund to the target account of the target user, generate payment data associated with the user, and record the payment data as behavior data.

At 211, the computing application sends an acquisition request, including user information to the payment server, to acquire payment data associated with the user. In some implementations, when a user pays a target user online through the payment platform, the user and the target user each has a corresponding account registered on the payment platform. In some implementations, the acquisition request can include a payment account registered by the user on the payment platform to acquire payment data related to the payment account. In some implementations, the acquisition request can include time information indicating payment data associated with the user within a predefined cycle period (for example, a day). In some implementations, the computing application can send, in advance, both a computing account registered by the user in the computing application and the payment account associated with the user to the payment server. The payment server, then, can dynamically acquire, according to the payment account, payment data related to the payment account, and actively push, according to the computing account, the payment data related to the payment account to the computing application. In some implementations, if the computing application itself has an online payment service and the user uses the online payment service provided by the computing application, the computing application can acquire payment data generated by the computing application. From 211, method 210 proceeds to 212.

At 212, the payment server receives the acquisition request, determines payment data corresponding to the user information included in the acquisition request, and sends back the determined payment data to the computing application. The payment data includes at least a user ID, and identification information that reflects a type of the payment service. In some implementations, if the acquisition request includes time information, the payment server can acquire, according to the time information, payment data associated with the user matching the time information. In some implementations, the payment server can perform data collating operations on the payment data before sending the collated payment data to the computing application. For example, the payment data stored by the payment server may include the amount of payment, and the payment time. The payment server can remove the amount of payment and the payment time from the payment data and send the processed payment data to the computing application. From 212, method 210 proceeds to 213.

At 213, after acquiring the payment data from the payment server, the computing application determines, according to the user ID included in the payment data, that the payment data is associated with a user account. In addition, the computing application determines, according to the identification information included in the payment data, a carbon-saving quantity quantization algorithm for calculating a carbon-saving quantity of the payment data. The carbon-saving quantity quantization algorithm can be a carbon-saving quantity quantization algorithm specific to savings related to the use of paper products. From 213, method 210 proceeds to 214.

At 214, a carbon-saving quantity associated with the user using the online payment service is calculated according to the determined carbon-saving quantity quantization algorithm and the acquired payment data. In addition, specific user data can be processed according to the calculated carbon-saving quantity associated with the user. In some implementations, the payment application includes a locating function capable of determining the user's location information (for example, by using GPS or WIFI/cellular-triangulation information) when the user sends an online payment instruction. The computing application can determine, according to a payment order number in the acquired payment data, the number of times that the user uses the online payment service. The payment order number uniquely identifies one online payment service. In addition, the computing application can acquire, through the payment application, user location information when the user uses the online payment service, and determine $EF_y$ in Equation (1) according to a geographic region corresponding to the user location information. Accordingly, a carbon-saving quantity specific to savings with respect to use of a printed paper bill each time the user uses the online payment service can be calculated. If the user uses the online payment service n times in a same geographic region, corresponding to the same $EF_y$, a carbon-saving quantity associated with the user specific to savings related to using printed paper bills can be calculated as $n \times ER_y$. If the user uses the online payment service multiple times in different geographic regions, corresponding to different $EF_y$, a carbon-saving quantity associated with the user specific to savings related to using printed paper bills is an accumulation of carbon-saving quantities associated with the user in the different geographic regions.

In some implementations, the calculated carbon-saving quantity associated with the user using the online payment service can be converted into points. After the user logs into the computing application, the points, indicating reduced carbon footprints by using an online payment service, can be presented to the user. After 214, method 211 stops.

Scenario 3: A User Uses an Online Reservation Service.

In some implementations, the online reservation service can include at least one of online restaurant reservation, hotel reservation, venue booking, and hospital registration services. Compared to the traditional reservation service (that is, a user goes to a physical service site to make a reservation), the online reservation service can save the user a trip to the physical service site. If the trip is taken to the physical service site, for example, by driving a vehicle, data related to carbon emissions generated by the trip can be saved.

After the user uses the online reservation service, a service provider that provides the online reservation service (for example, a hospital website) can generate online reservation data based on the user's online reservation behavior. The online reservation data can be used as behavior data for the user in using the online reservation service. A carbon-saving quantity associated with using the online reservation service can be calculated based on the behavior data.

Similar to scenario 1, the calculation of a carbon-saving quantity can be performed by a computing application or a server having a carbon-saving quantity computing function. In some implementations, a service provider capable of providing the online reservation service includes a reservation platform, a hospital, a hotel, and a restaurant. By taking the reservation platform as an example, the user can use the online reservation service through an application of the reservation platform (hereinafter referred to as a reservation application). Behavior data generated while the user is using the online reservation service can be generated by a server of the reservation platform (hereinafter referred to as a reservation server).

Figure 2C:
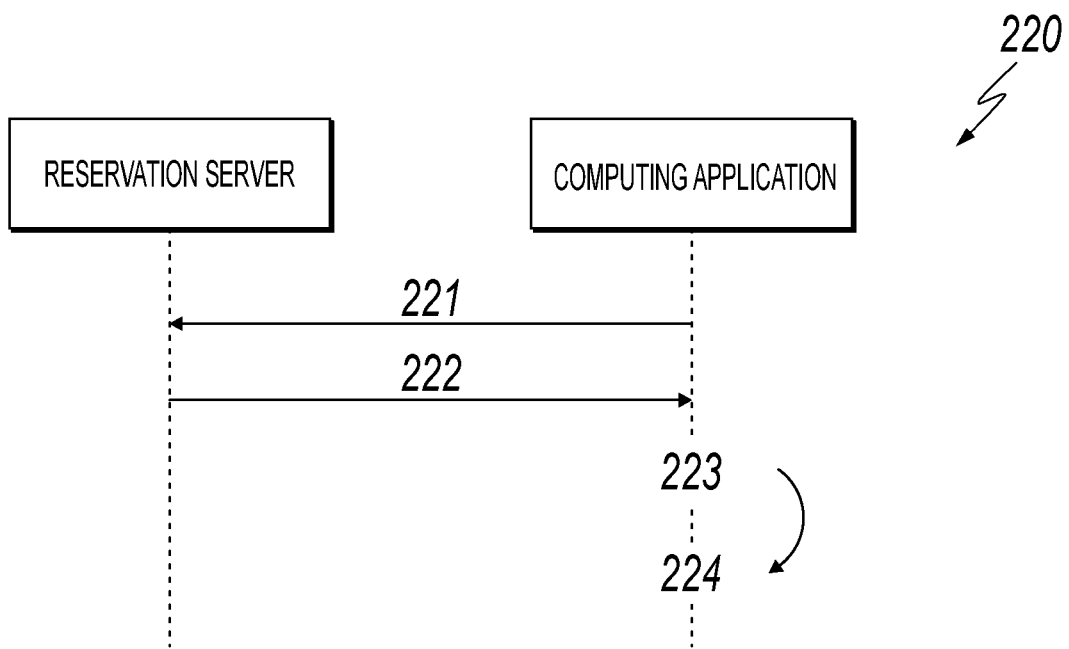

FIG. 2C shows an example method 220 of acquiring and calculating a user carbon-saving quantity making a reservation online. In general, when a user makes an online reservation, the user sends a reservation request to a reservation server through a corresponding reservation application. The reservation request can include user information (for example, medical insurance information of the user, user name, ID card number, a reservation account registered by the user in the reservation application), registration type information (for example, a specialist number, an ordinary doctor number), and hospital information selected by the user (for example, hospital level, hospital name). After receiving the reservation request, the reservation server can register, according to the received reservation request, a corresponding hospital. After the registration succeeds, the reservation server sends back an electronic registration form to the reservation application, generates reservation data associated with the user, and records the reservation data as behavior data.

At 221, the computing application sends an acquisition request, including user information to the reservation server, to acquire reservation data associated with the user. In some implementations, the acquisition request can include a reservation account registered by the user on the reservation platform to acquire reservation data related to the reservation account. In some implementations, the acquisition request can include medical insurance information of the user, user name, ID card number, and a reservation account registered by the user in the reservation application. In some implementations, the acquisition request can include time information indicating reservation data associated with the user within a predefined cycle period (for example, a day). In some implementations, the computing application can send both a computing account registered by the user in the computing application and the reservation account of the user to the reservation server. The reservation server, then, can dynamically acquire, according to the reservation account, reservation data related to the reservation account, and actively push, according to the computing account, the reservation data related to the reservation account to the computing application. In some implementations, if the computing application itself has an online reservation service and the user uses the online reservation service provided by the computing application, the computing application can acquire reservation data generated by the computing application. From 221, method 220 proceeds to 222.

At 222, the reservation server receives the acquisition request, determines reservation data corresponding to the user information included in the acquisition request, and sends back the determined reservation data to the computing application. The reservation data includes at least a user ID, and identification information that reflects a type of the reservation service. In some implementations, the reservation server can perform data collating operations on the reservation data before sending the collated reservation data to the computing application. For example, the reservation data stored by the reservation server may include a reservation type, and a date of hospital visit. The reservation server can remove the reservation type and the date of hospital visit from the reservation data, and send the processed reservation data to the computing application. From 222, method 220 proceeds to 223.

At 223, after acquiring the reservation data from the reservation server, the computing application determines, according to the user ID included in the reservation data, that the reservation data is associated with a user account. In addition, the computing application determines, according to the identification information included in the reservation data, a carbon-saving quantity quantization algorithm for calculating a carbon-saving quantity of the reservation data. The carbon-saving quantity quantization algorithm can be a carbon-saving quantity quantization algorithm specific to reduction of trips by driving a vehicle. From 223, method 220 proceeds to 224.

At 224, a carbon-saving quantity associated with the user using the online reservation service is calculated according to the determined carbon-saving quantity quantization algorithm and the acquired reservation data. In addition, specific user data can be processed according to the calculated carbon-saving quantity associated with the user. In some implementations, the reservation application includes a locating function capable of determining the user's location information (for example, by using GPS or WIFI/cellular-triangulation information) when the user sends an online reservation instruction. The reservation data acquired by the computing application can include the location of the user when the user uses the online reservation service. Based on a hospital address included in the reservation data, the computing application can determine the location of the hospital, calculate a distance L between the user location and the hospital location, and uses Equation (2) to calculate a carbon-saving quantity specific to avoidance of a trip by driving a vehicle for the distance L.

In some implementations, the calculated carbon-saving quantity associated with the user using the online reservation service can be converted into points. After the user logs into the computing application, the points, indicating reduced carbon footprints by using an online reservation service, can be presented to the user. After 224, method 220 stops.

Scenario 4: A User Uses an Online Bill Payment Service.

In some implementations, the online bill payment service can include at least one of paying water fees, electricity fees, natural gas fees, and traffic fines online. Compared to the traditional bill payment service, the online bill payment service can save the user a trip to the physical bill payment site. If the trip is taken to the physical bill payment site, for example, by driving a vehicle, data related to carbon emissions generated by the trip can be saved.

After the user uses the online bill payment service, a service provider that provides the online bill payment service can generate online bill payment data based on the user's online bill payment behavior. The online bill payment data can be used as behavior data for the use in using the online bill payment service. A carbon-saving quantity associated with the user using the online bill payment service can be calculated based on the behavior data.

Similar to scenario 1, the calculation of a carbon-saving quantity can be performed by a computing application or a server having a carbon-saving quantity computing function. In some implementations, a service provider capable of providing the online bill payment service includes an online bill payment platform, a bill payment website, and a bank. By taking the bill payment platform as an example, the user can use the online bill payment service through an application corresponding to the bill payment platform (hereinafter referred to as a bill payment application). Behavior data generated while the user is using the online bill payment service can be generated by a server of the bill payment platform (hereinafter referred to as a bill payment server).

Figure 2D:
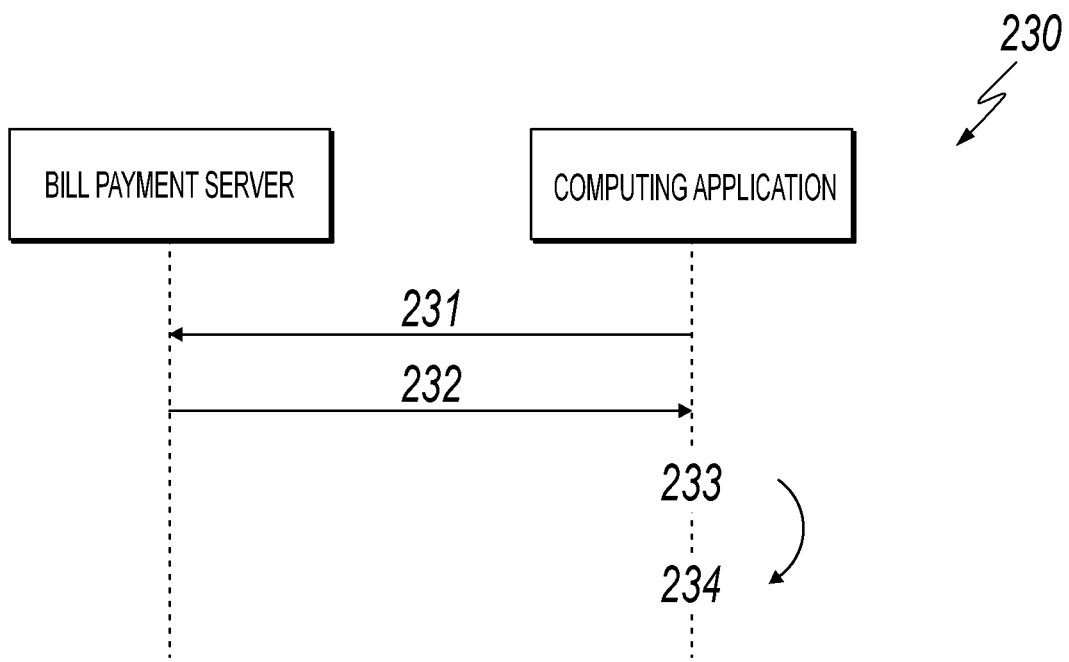

FIG. 2D shows an example method 230 of acquiring and calculating a user carbon-saving quantity making a bill payment online. In general, when a user makes an online bill payment, the user sends a bill payment request to a bill payment server through a corresponding bill payment application. The bill payment request can include user information (for example, driver's license number, ID card number, a penalty ticket number of the user, a bill payment account registered by the user on the bill payment platform). After receiving the bill payment request, the bill payment server can deduct, according to the received bill payment request, a corresponding amount of fund from the account of the user, and pay the bill to the corresponding bill payment website. After the bill payment succeeds, the bill payment server sends back an electronic payment voucher to the bill payment application, generates bill payment data associated with the user, and records the bill payment data as behavior data.

At 231, the computing application sends an acquisition request, including user information to the bill payment server, to acquire bill payment data associated with the user. In some implementations, when a user makes an online bill payment, the user first registers a corresponding account on the bill payment platform. The account needs to have sufficient amount of money to make the online bill payment successful. In some implementations, the acquisition request can include at least one of a driver's license number, ID card number, a penalty ticket number of the user, and a bill payment account registered by the user on the bill payment platform. In some implementations, the acquisition request can include time information indicating bill payment data associated with the user within a predefined cycle period (for example, a day). In some implementations, the computing application can send both a computing account registered by the user in the computing application and the bill payment account associated with the user to the bill payment server. The bill payment server, then, can dynamically acquire, according to the bill payment account, bill payment data related to the bill payment account, and actively push, according to the computing account, the bill payment data related to the bill payment account to the computing application. In some implementations, if the computing application itself has an online bill payment service and the user uses the online bill payment service provided by the computing application, the computing application can acquire bill payment data generated by the computing application. From 231, method 230 proceeds to 232.

At 232, the bill payment server receives the acquisition request, determines bill payment data corresponding to the user information included in the acquisition request, and sends back the determined bill payment data to the computing application. The bill payment data includes at least a user ID, and identification information that reflects a type of the bill payment service. In some implementations, the bill payment server can perform data collating operations on the bill payment data before sending the collated bill payment data to the computing application. From 232, method 230 proceeds to 233.

At 233, after acquiring the bill payment data from the bill payment server, the computing application determines, according to the user ID included in the bill payment data, that the bill payment data is associated with a user account. In addition, the computing application determines, according to the identification information included in the bill payment data, at least one carbon-saving quantity quantization algorithm for calculating a carbon-saving quantity of the bill payment data. The at least one carbon-saving quantity quantization algorithm can be a carbon-saving quantity quantization algorithm specific to reduction of trips by driving a vehicle, a carbon-saving quantity quantization algorithm specific to savings related to the use of paper products, or a combination of a carbon-saving quantity quantization algorithm specific to reduction of trips by driving a vehicle and a carbon-saving quantity quantization algorithm specific to savings related to the use of paper products. From 233, method 230 proceeds to 234.

At 234, a carbon-saving quantity associated with the user using the online bill payment service is calculated according to the determined carbon-saving quantity quantization algorithm and the acquired bill payment data. In addition, specific user data can be processed according to the calculated carbon-saving quantity associated with the user. In some implementations, the bill payment application includes a locating function capable of determining the user's location information (for example, by using GPS or WIFI/cellular-triangulation information) when the user sends an online bill payment instruction. The computing application can determine, according to a bill payment order number in the acquired bill payment data, the number of times that the user uses the online bill payment service. The bill payment order number uniquely identifies one online bill payment service. In addition, the computing application can acquire, through the bill payment application, user location information when the user uses the online bill payment service, and determine $EF_y$ in Equation (1) according to a geographic region corresponding to the user location information. Accordingly, a carbon-saving quantity specific to savings with respect to use of a printed paper bill each time the user uses the online bill payment service can be calculated. If the user uses the online bill payment service n times in a same geographic region, corresponding to the same $EF_y$, a carbon-saving quantity associated with the user specific to savings related to using printed paper bills can be calculated as $n \times ER_y$. If the user uses the online bill payment service multiple times in different geographic regions, corresponding to different $EF_y$, a carbon-saving quantity associated with the user specific to savings related to using printed paper bills is an accumulation of carbon-saving quantities associated with the user in the different geographic regions.

In some implementations, the computing application can determine, according to the user location information when the user uses the online bill payment service, a bill payment site location (for example, a bank) closest to the user location. The computing application, then, calculates a distance L between the user location and the bill payment site location, and uses Equation (2) to calculate a carbon-saving quantity specific to avoidance of a trip by driving a vehicle for the distance L. In some implementations, the calculated carbon-saving quantity associated with the user can include both a carbon-saving quantity specific to avoidance of a trip by driving a vehicle, and a carbon-saving quantity specific to savings related to using printed paper bills.

In some implementations, the calculated carbon-saving quantity associated with the user using the online bill payment service can be converted into points. After the user logs into the computing application, the points, indicating reduced carbon footprints by using an online bill payment service, can be presented to the user. After 234, method 230 stops.

Scenario 5: A User Goes Out on Foot, and Walking Data is Monitored by a Health Service.

In some implementations, walking can reduce carbon footprints of a user. The user can walk to a physical service site. For example, the user can walk to a hospital to register, walk to a ticketing site to purchase a ticket, and walk to a bill payment site to pay related fees.

Walking data can be produced by a health service application (for example, a walking application) having a walking data collection function. The walking data can be used as behavior data for walking. A carbon-saving quantity associated with the user can be calculated based on the behavior data. In some implementations, the walking data can include at least one of the number of steps, location information during walking, and a walking distance. In some implementations, the walking data can include user information (for example, an account registered by the user in the walking application).

Similar to scenario 1, the calculation of a carbon-saving quantity can be performed by a computing application or a server having a carbon-saving quantity computing function. In some implementations, the walking data can be obtained by a walking application through a corresponding collection algorithm, a model, or a sensing device (for example, a smart bracelet, a smart watch).

Figure 2E:
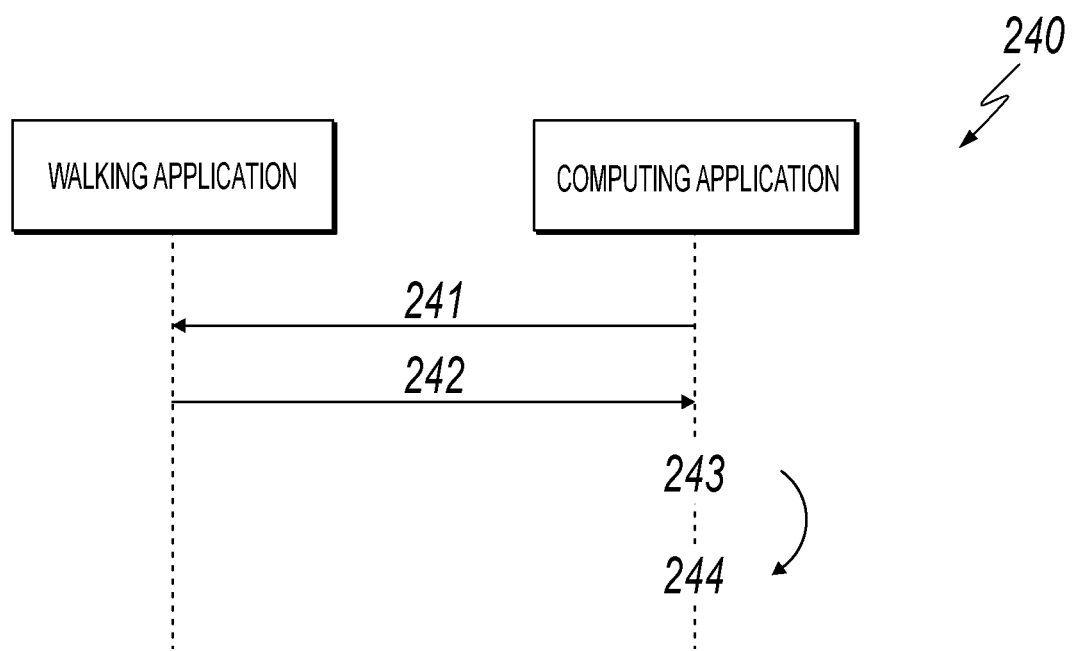

FIG. 2E shows an example method 240 of acquiring and calculating a user carbon-saving quantity by walking. At 241, the computing application sends an acquisition request, including user information to the walking application, to acquire walking data associated with the user. In some implementations, the acquisition request can include an account registered by the user on the walking application. In some implementations, the walking application can actively push, according to the registered account, walking data related to the user information to the computing application. In some implementations, if the computing application itself has a walking data collection function, the computing application can acquire walking data generated by the computing application. From 241, method 240 proceeds to 242.

At 242, the walking application receives the acquisition request, determines walking data corresponding to the user information included in the acquisition request, and sends back the determined walking data to the computing application. The walking data includes at least a user ID, and identification information that reflects a type of a walking behavior. From 242, method 240 proceeds to 243.

At 243, after acquiring the walking data from the walking application, the computing application determines, according to the user ID included in the walking data, that the walking data is associated with a user account. In addition, the computing application determines, according to the identification information included in the walking data, a carbon-saving quantity quantization algorithm for calculating a carbon-saving quantity of the walking data. The carbon-saving quantity quantization algorithm can be a carbon-saving quantity quantization algorithm specific to reduction of trips by driving a vehicle. From 243, method 240 proceeds to 244.

At 244, a carbon-saving quantity associated with the user by walking is calculated according to the determined carbon-saving quantity quantization algorithm and the acquired walking data. In addition, specific user data can be processed according to the calculated carbon-saving quantity associated with the user. In some implementations, if the walking data includes location information of the user during walking, the computing application can determine, based on the location information in the walking data, a walking distance of the user. The carbon-saving quantity associated with the user by walking, then, can be determined based on the walking distance and the determined carbon-saving quantity quantization algorithm. After 244, method 240 stops.

Figure 3:
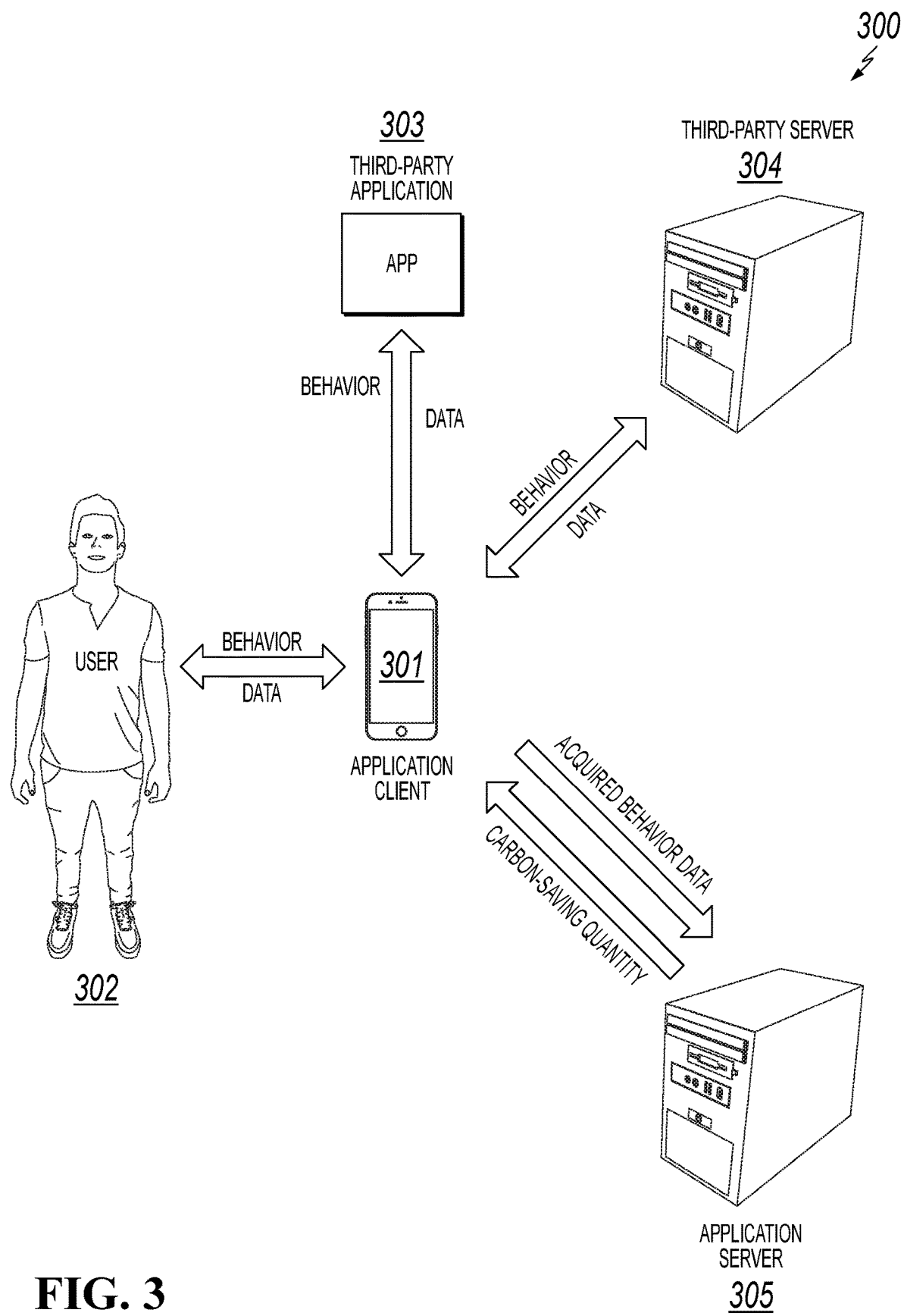
FIG. 3 is a block diagram illustrating a computing-based architecture for calculating individual carbon footprints, according to an implementation of the present disclosure.

FIG. 3 is a block diagram illustrating a computing-based architecture 300 for calculating individual carbon footprints, according to an implementation of the present disclosure. As illustrated in FIG. 3, an application client 301 acquires fragmented user behavior data associated with a user 302, a third-party application 303, a third-party server 304, or a combination of a third-party application 303 and a third-party server 304. The behavior data includes behavior data generated when the user 302 uses different Internet services. After acquiring the behavior data, the application client 301 sends the acquired behavior data to an application server 305. The application server 305 calculates a carbon-saving quantity associated with the user 302, and returns the carbon-saving quantity to the application client 301 for presentation to the user 302.

Figure 4A:
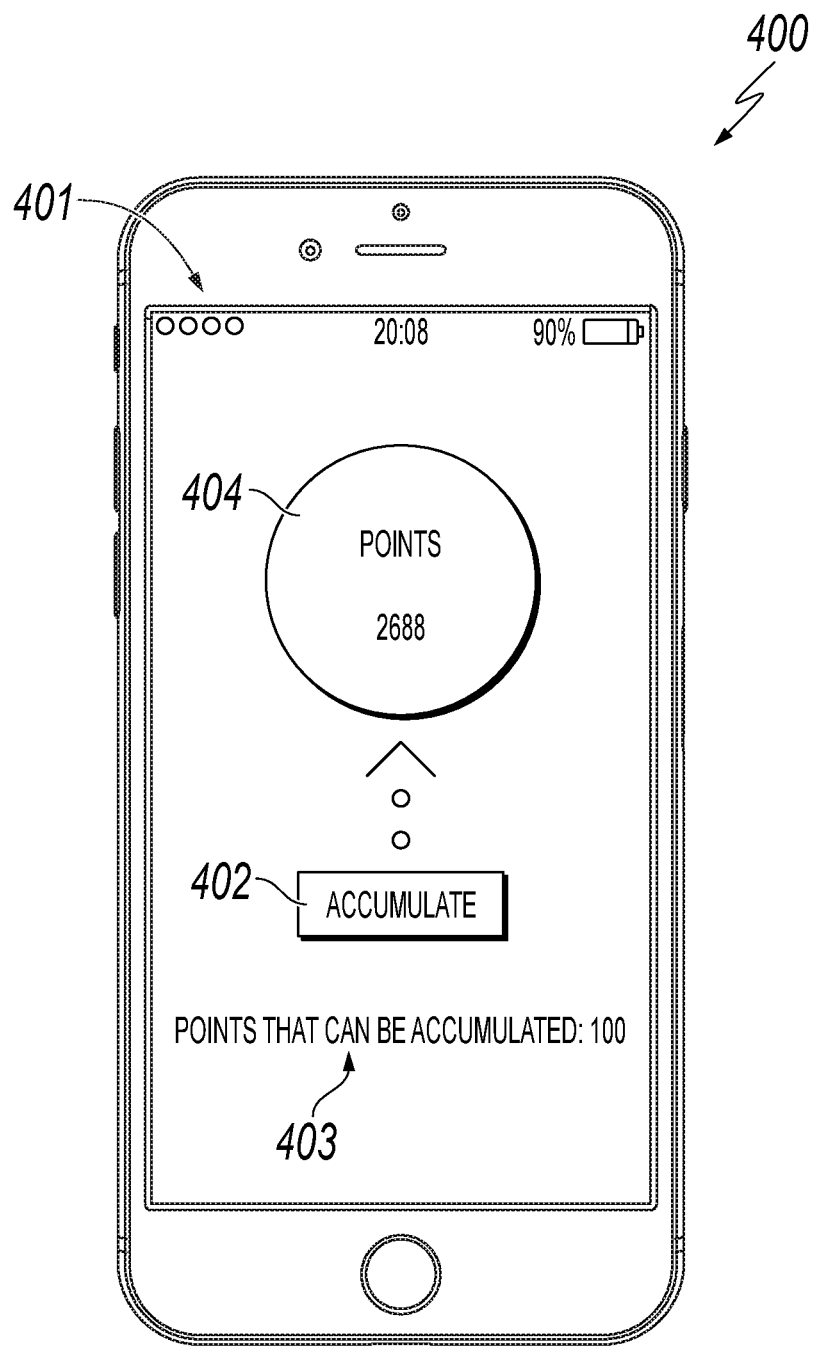
FIGS. 4A-4C are illustrative screenshots related to point accumulation, according to an implementation of the present disclosure.
Figure 4B:
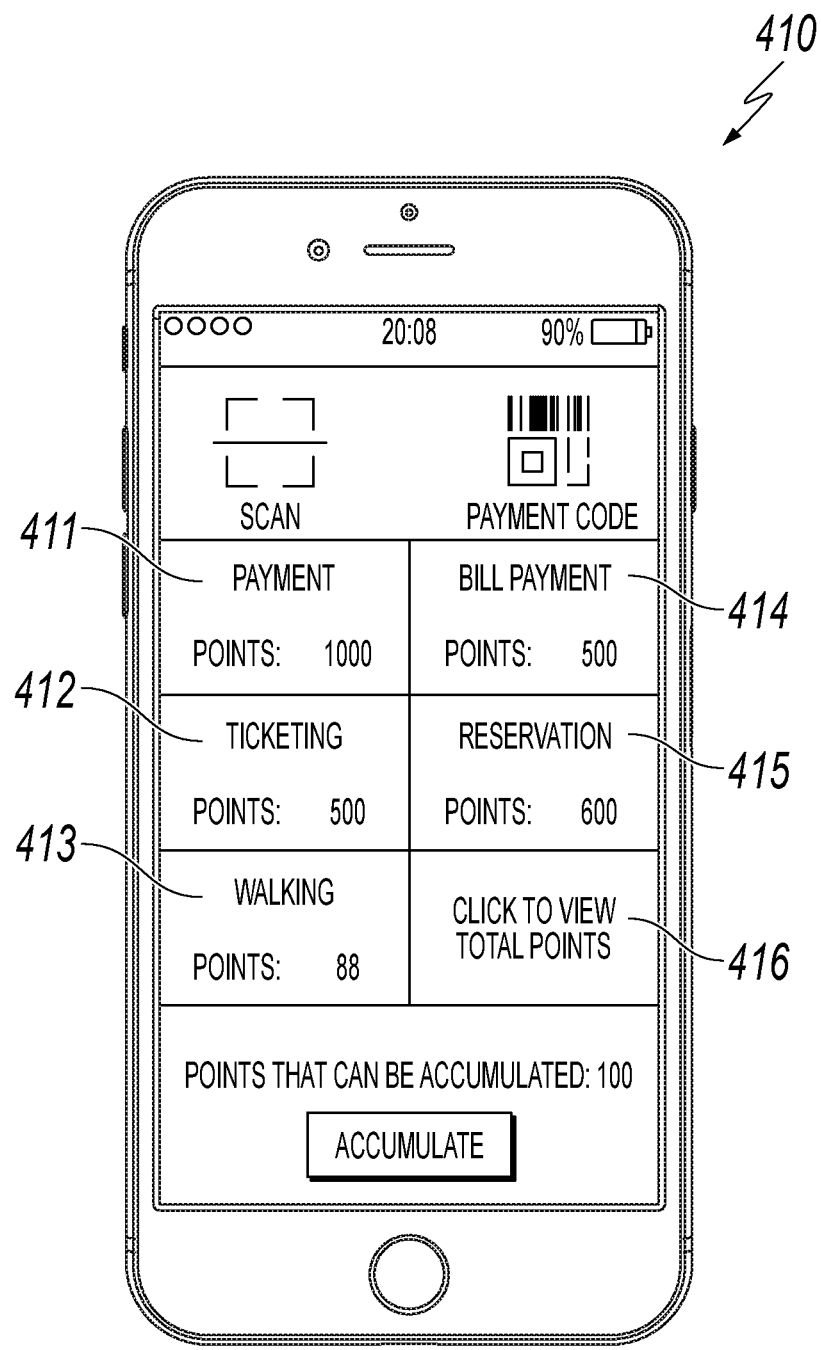
Figure 4C:
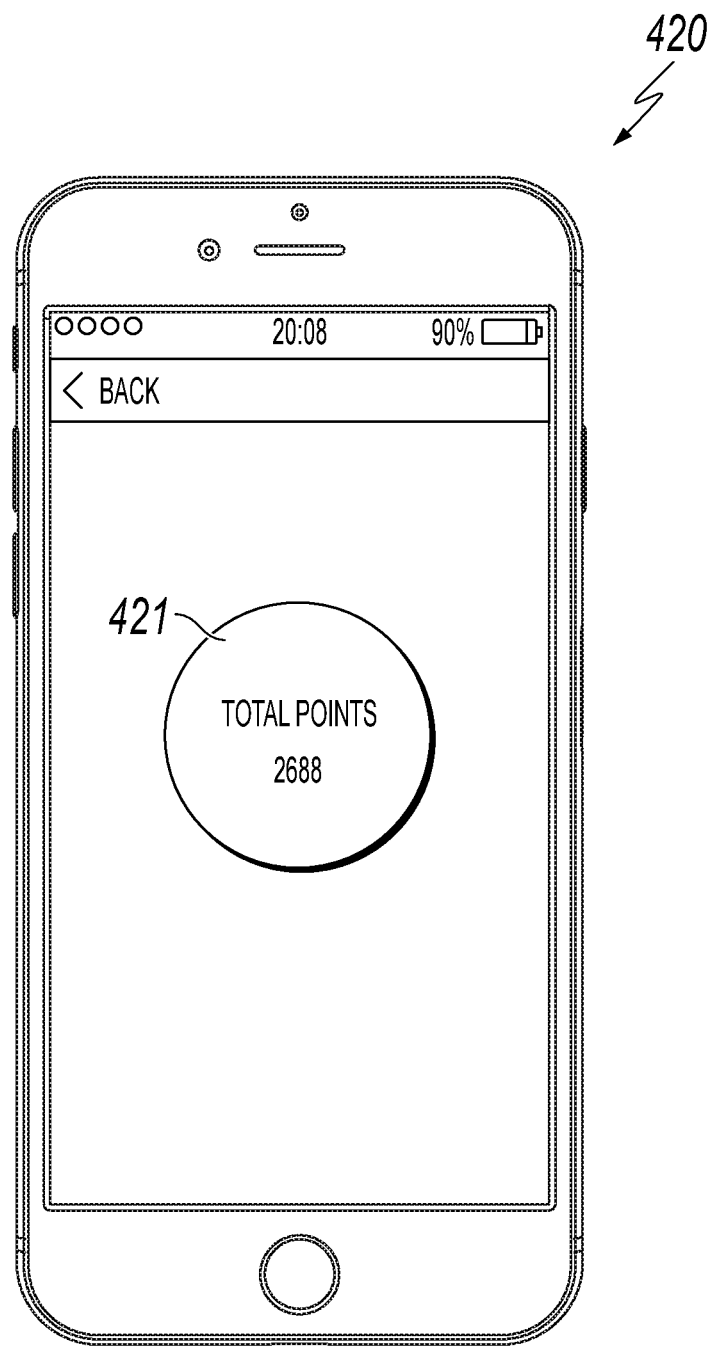

FIGS. 4A-4C are illustrative screenshots 400, 410, and 420 related to point accumulation, according to an implementation of the present disclosure. For clarity of presentation, the description that follows generally describes screenshots 400, 410, and 420 in the context of the other figures in this description. In some implementations, point accumulation can be made in response to a confirming instruction sent by a user. For example, a control component configured to accumulate points can be provided to the user. The control component can be a suspension control component, an embedded control component, or a popup window control component, which can be implemented in hardware, software, or both.

In FIG. 4A, a control component is embedded in an application interface 401. The user can request point accumulation by clicking an "Accumulate" button 402. Based on this, accumulating the converted points and total points of the user may include: after receiving a confirming instruction (that is, clicking the "Accumulate" button 402) sent by the user, points that can be accumulated 403 are added to the total points 404 associated with the user.

Total points 404 can be calculated and displayed respectively according to different types of human behavior. As shown in FIG. 4B, the application interface includes different types of behavior items (for example, payment 411, ticketing 412, walking 413, bill payment 414, reservation 415), and total points for each type of behavior item is displayed in each type of behavior item. In addition, total points for all types of behavior items can be displayed, for example, by clicking "Click to view total points" 416.

After clicking "Click to view total points" 416 in FIG. 4B, the total points 421 for all types of behavior items is displayed as shown in FIG. 4C.

In some implementations, different users can acquire non-accumulated points from each other. For example, a user can send an acquisition instruction to acquire at least part of non-accumulated points of other users. As a result, the at least part of non-accumulated points of other users are deducted from accounts associated with the other users, and added to the total points of the user. In some implementations, the other users are related to the user. For example, the other users are listed in a user's contact list.

Figure 5A:
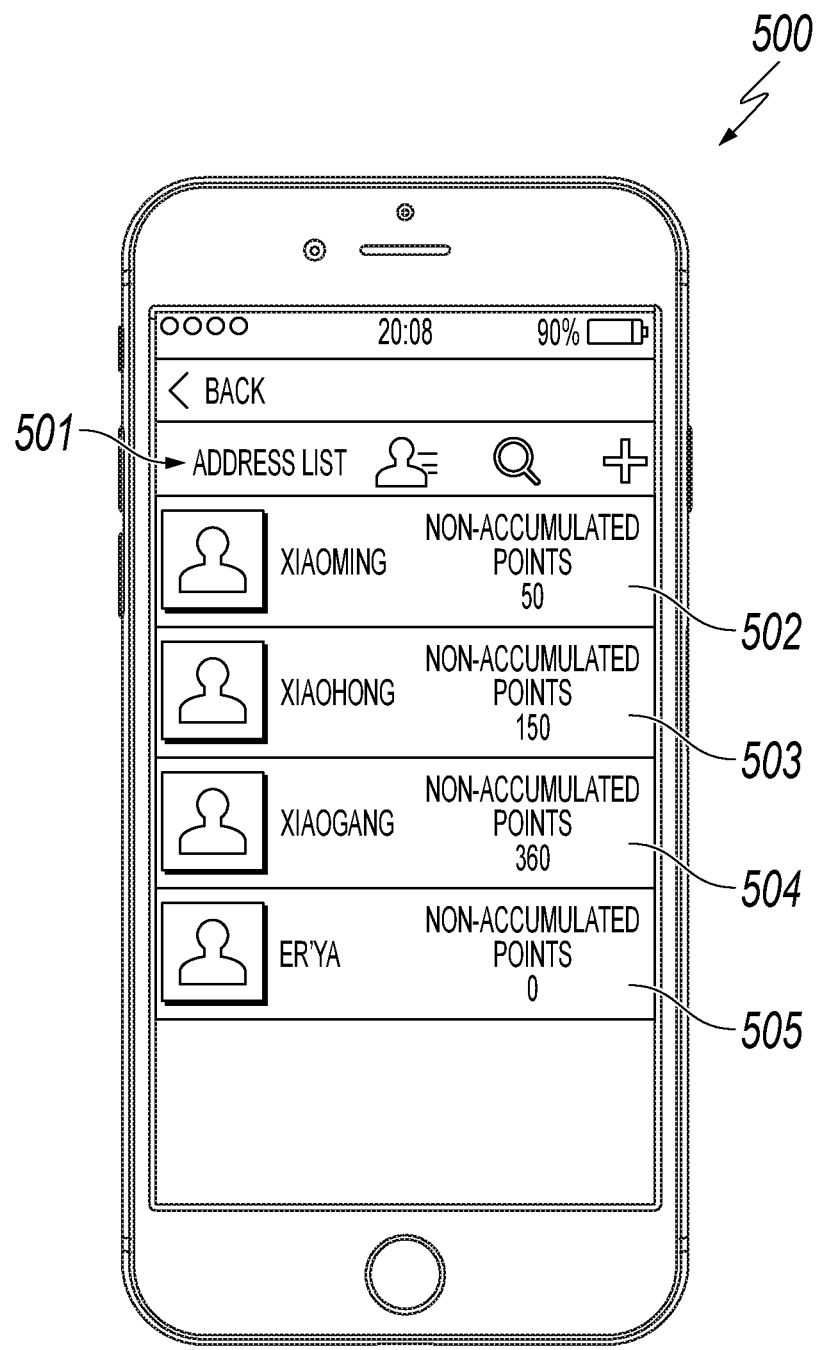
FIGS. 5A-5B are schematic diagrams of point acquisition between users, according to an implementation of the present disclosure.
Figure 5B:
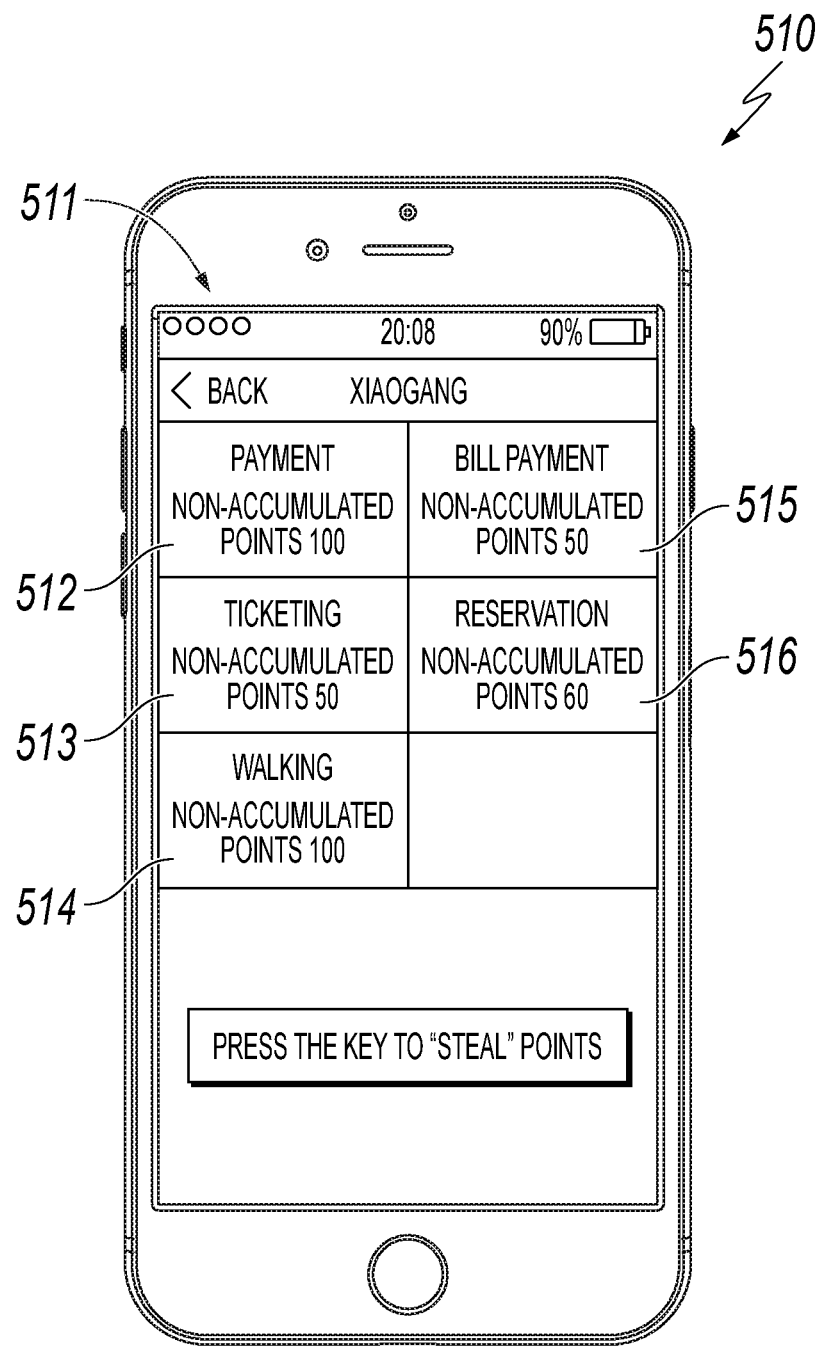

FIGS. 5A-5B are schematic diagrams 500 and 510 of point acquisition between users, according to an implementation of the present disclosure. For clarity of presentation, the description that follows generally describes diagrams 500 and 510 in the context of the other figures in this description. As shown in FIG. 5A, non-accumulated points are displayed for each contact in a user's contact list (Address list) 501. For example, contact Xiaoming 502 has 50 non-accumulated points, contact Xiaohong 503 has 150 non-accumulated points 503, contact Xiaogang 504 has 360 non-accumulated points, and contact Er'ya 505 has 0 non-accumulated points. The user can click on any contact in the contact list to acquire non-accumulated points of the clicked contact. As shown in FIG. 5B, after the user clicks on contact Xiaogang 504 in the contact list 501, the user may be presented with a detailed view 511 of contact Xiaogang 504. The detailed view 511 shows non-accumulated points corresponding to different types of behaviors of contact Xiaogang 504. For example, Xiaogang 504 has 100 non-accumulated points in Payment 512, 50 non-accumulated points in Ticking 513, 100 non-accumulated points in Walking 514, 50 non-accumulated points in Bill payment 515, and 60 non-accumulated points in Reservation 516. The user can click on a particular behavior item (for example, Reservation) to acquire non-accumulated points corresponding to the particular behavior item (for example, 60 non-accumulated points in Reservation).

In some implementations, virtual goods matching total points associated with a user can be assigned to the user. The virtual goods can include a virtual tree, a virtual badge, and a virtual medal. The virtual goods have different display states according to differing total points. For example, according to pre-divided point intervals, a point interval within which the total points fall can be determined, and a display state of the virtual goods associated with the user can be determined based on a predefined relationship between the point intervals and display states of the virtual goods. The display states of the virtual goods include, for example, a size, a shape, and a color of the virtual goods. For example, a virtual medal can be a bronze medal, a silver medal, or a gold medal.

Figure 6:
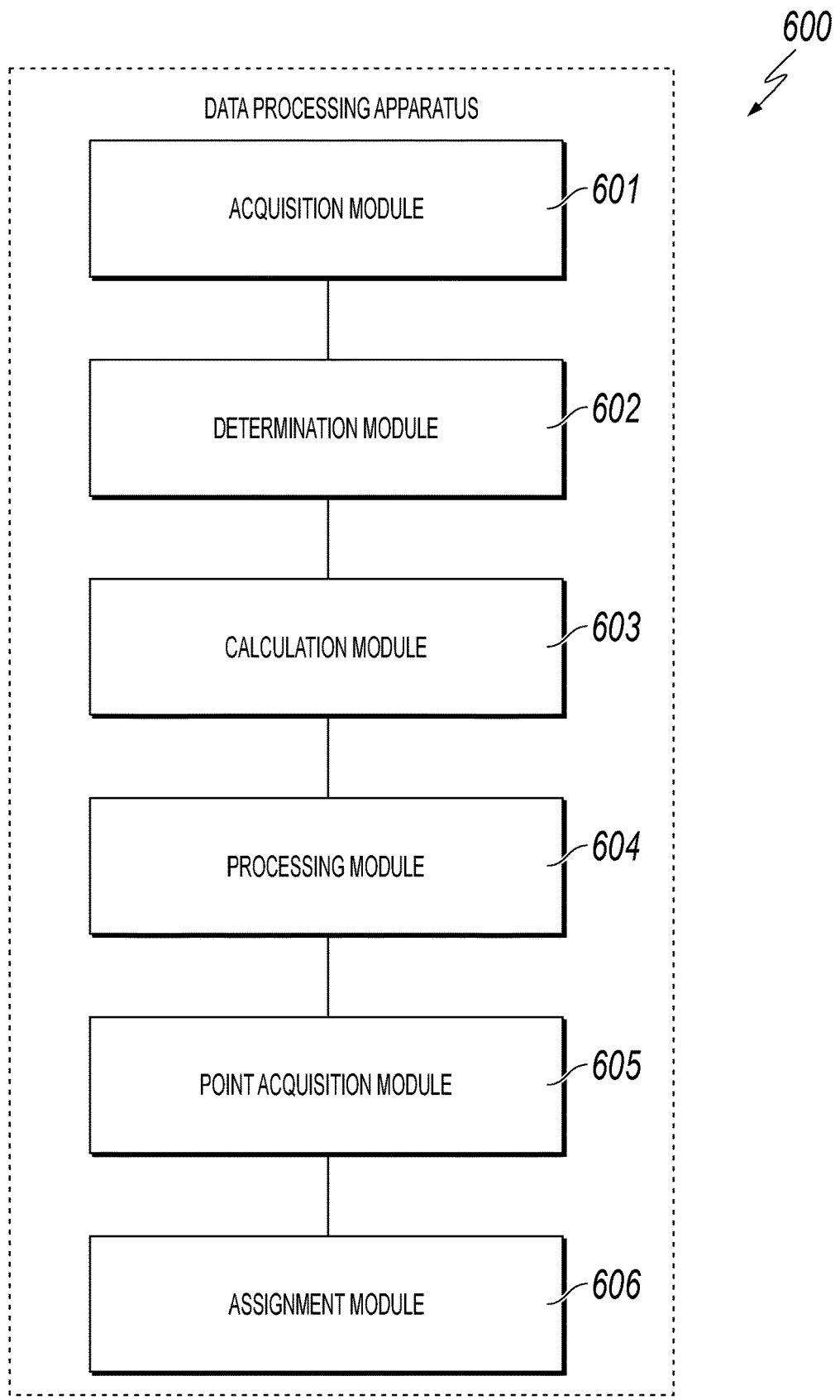
FIG. 6 is a block diagram illustrating an example data processing system for calculating individual carbon footprints, according to an implementation of the present disclosure.

FIG. 6 is a block diagram illustrating an example data processing system 600 for calculating individual carbon footprints, according to an implementation. For clarity of presentation, the description that follows generally describes system 600 in the context of the other figures in this description. The system 600 can include an acquisition unit 601, a determination unit 602, a calculation unit 603, a processing unit 604, a point acquisition unit 605, and an assignment unit 606, which can be implemented in hardware, software, or both.

The acquisition unit 601 can acquire behavior data associated with a user, as discussed in step 105 of FIG. 1. The determination unit 602 can determine at least one preset carbon-saving quantity quantization algorithm based on identification information of an Internet service, as discussed in step 110 of FIG. 1 and steps 203, 213, 223, 233, and 243 of FIGS. 2A-2E. The calculation unit 603 can calculate a carbon-saving quantity based on the acquired behavior data and the determined preset carbon-saving quantity quantization algorithm, as discussed in step 115 of FIG. 1 and steps 204, 214, 224, 234, and 244 of FIGS. 2A-2E. The processing unit 604 can process specific user data based on the calculated carbon-saving quantity and user identification, as discussed in step 120 of FIG. 1. In addition, the processing unit 604 can convert the calculated carbon-saving quantity associated with the user into points based on a preset conversion rule, and accumulate the converted points and total points of the user to obtain updated total points of the user. The point acquisition unit 605 can receive an acquisition instruction sent by a user for non-accumulated points of other users, acquire all or some points in the non-accumulated points of other users, and accumulate the acquired all or some points and total points of the user to obtain updated total points of the user. The assignment unit 606 can determine updated total points of the user, and assign virtual goods matching the updated total points to the user.

Figure 7:
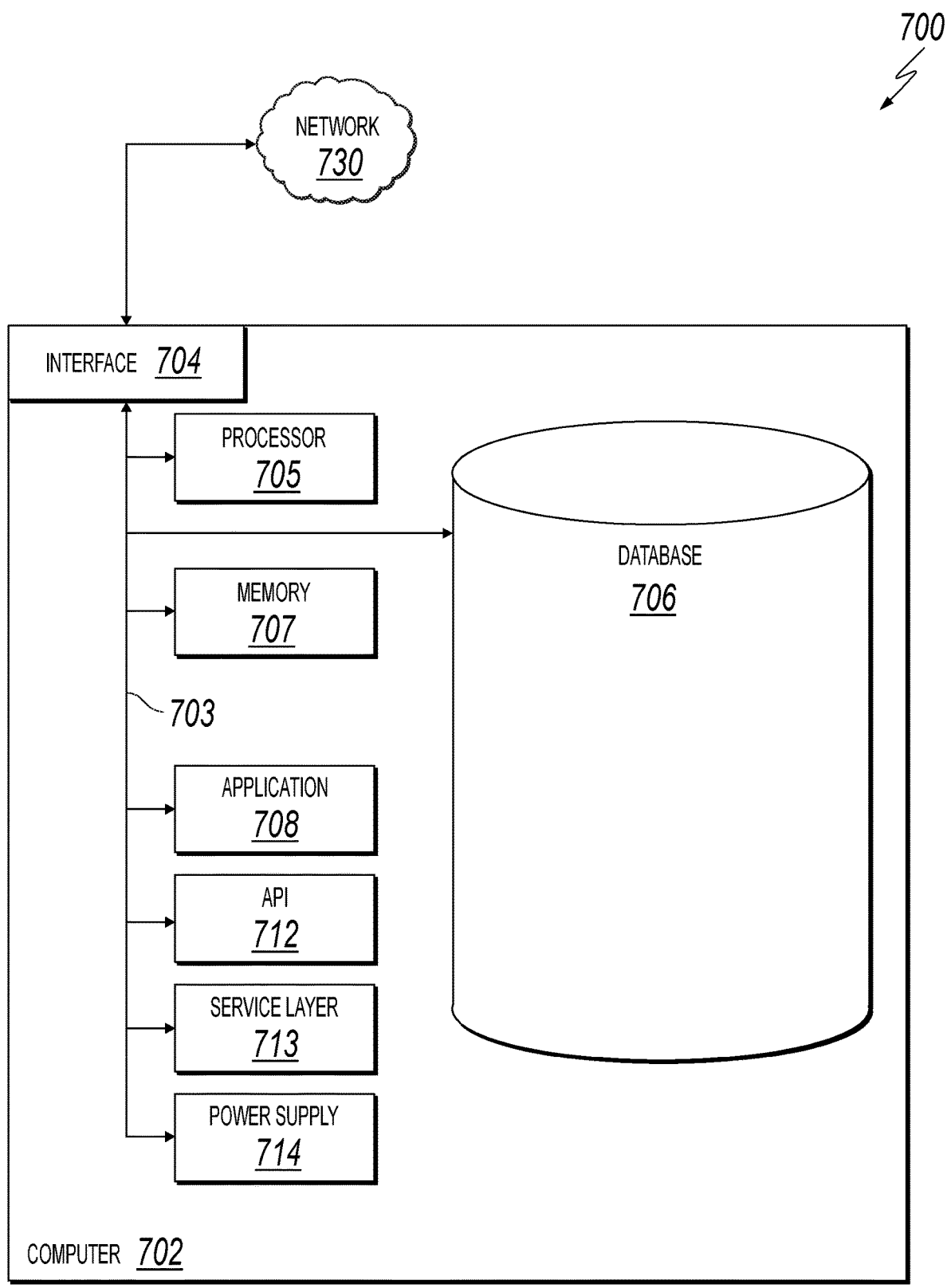
FIG. 7 is a block diagram illustrating an example computer system used to provide computational functionalities associated with described algorithms, methods, functions, processes, flows, and procedures as described in the instant disclosure, according to an implementation of the present disclosure.

FIG. 7 is a block diagram of an example computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). Memory 707 can store any data consistent with this disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power-supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a computer-implemented method, comprising: obtaining behavior data associated with a user, wherein the behavior data is generated when the user uses an Internet service, and the behavior data comprises a user identification and identification information indicating the Internet service; determining at least one predefined carbon-saving quantity quantization algorithm based on the identification information of the Internet service; calculating a carbon-saving quantity associated with the user based on the obtained behavior data and the determined at least one predefined carbon-saving quantity quantization algorithm; and based on the calculated carbon-saving quantity associated with the user and the user identification, processing user data, wherein the user data is related to the carbon-saving quantity associated with the user.

The foregoing and other described implementations can each, optionally, include one or more of the following features:

A first feature, combinable with any of the following features, wherein the at least one predefined carbon-saving quantity quantization algorithm comprises: a first predefined algorithm, wherein the first predefined algorithm is a carbon-saving quantity quantization algorithm for targeting savings of paper products; and a second predefined algorithm, wherein the second predefined algorithm quantizes a carbon-saving quantity of reduction of trips by taking vehicles.

A second feature, combinable with any of the previous or following features, wherein, when the first predefined algorithm is used to calculate the carbon-saving quantity, calculating a carbon-saving quantity associated with the user comprises: based on the behavior data, determining at least a number of times that the user uses the Internet service and a geographical location of the user when the user uses the Internet service; and calculating the carbon-saving quantity associated with the user based on the determined number of times that the user uses the Internet service, the determined geographical position of the user when the user uses the Internet service, and the first predefined algorithm.

A third feature, combinable with any of the previous or following features, wherein, when the second predefined algorithm is used to calculate the carbon-saving quantity, calculating a carbon-saving quantity associated with the user comprises: based on the behavior data, determining at least a number of walking steps or a walking distance of the user; and calculating the carbon-saving quantity associated with the user based on the determined number of walking steps or walking distance of the user and the second predefined algorithm.

A fourth feature, combinable with any of the previous or following features, wherein determining at least one predefined carbon-saving quantity quantization algorithm based on the identification information of the Internet service comprises determining at least one predefined carbon-saving quantity quantization algorithm based on the identification information of the Internet service and a plurality of pre-stored corresponding relationships between a plurality of Internet services and a plurality of carbon-saving quantity quantization algorithms.

A fifth feature, combinable with any of the previous or following features, wherein the Internet service comprises at least one of an electronic payment service, an online reservation service, an online ticketing service, an online bill payment service, and a health service.

A sixth feature, combinable with any of the previous or following features, wherein processing user data comprises: obtaining a plurality of carbon-saving quantities associated with the user corresponding to a plurality of Internet services within a predefined period; accumulating the obtained plurality of carbon-saving quantities; and processing the user data based on the accumulated carbon-saving quantity associated with the user.

A seventh feature, combinable with any of the previous or following features, wherein processing the user data based on the accumulated carbon-saving quantity associated with the user comprises: adding the accumulated carbon-saving quantity associated with the user and a total carbon-saving quantity associated with the user together to obtain an updated total carbon-saving quantity associated with the user; and processing the user data based on the updated total carbon-saving quantity associated with the user.

An eighth feature, combinable with any of the previous or following features, wherein adding the accumulated carbon-saving quantity associated with the user and a total carbon-saving quantity associated with the user together to obtain an updated total carbon-saving quantity associated with the user comprises: converting the accumulated carbon-saving quantity associated with the user into points based on a predefined conversion rule; and adding the converted points and total points of the user together to obtain updated total points of the user.

A ninth feature, combinable with any of the previous or following features, wherein a control component configured to accumulate points is provided to the user, and adding the converted points and total points of the user together to obtain updated total points of the user comprises: receiving an instruction sent by the user through the control component confirming points accumulation; and adding the converted points and the total points of the user together.

A tenth feature, combinable with any of the previous or following features, further comprising: receiving an instruction sent by the user to obtain non-accumulated points of other users; obtaining at least part of the non-accumulated points of other users in response to receiving the instruction sent by the user to obtain non-accumulated points of other users; and adding the obtained at least part of the non-accumulated points of other users and the updated total points of the user together to obtain second updated total points of the user.

An eleventh feature, combinable with any of the previous or following features, further comprising determining the updated total points of the user; and based on the updated total points of the user, assigning, to the user, a virtual goods corresponding to the updated total points of the user.

A twelfth feature, combinable with any of the previous or following features, wherein the virtual goods has different display states corresponding to different total points.

In a second implementation, a non-transitory, computer-readable medium storing one or more instructions executable by a computer system to perform operations comprising: obtaining behavior data associated with a user, wherein the behavior data is generated when the user uses an Internet service, and the behavior data comprises a user identification and identification information indicating the Internet service; determining at least one predefined carbon-saving quantity quantization algorithm based on the identification information of the Internet service; calculating a carbon-saving quantity associated with the user based on the obtained behavior data and the determined at least one predefined carbon-saving quantity quantization algorithm; and based on the calculated carbon-saving quantity associated with the user and the user identification, processing user data, wherein the user data is related to the carbon-saving quantity associated with the user.

The foregoing and other described implementations can each, optionally, include one or more of the following features:

A first feature, combinable with any of the following features, wherein the at least one predefined carbon-saving quantity quantization algorithm comprises: a first predefined algorithm, wherein the first predefined algorithm is a carbon-saving quantity quantization algorithm for targeting savings of paper products; and a second predefined algorithm, wherein the second predefined algorithm quantizes a carbon-saving quantity of reduction of trips by taking vehicles.

A second feature, combinable with any of the previous or following features, wherein, when the first predefined algorithm is used to calculate the carbon-saving quantity, calculating a carbon-saving quantity associated with the user comprises: based on the behavior data, determining at least a number of times that the user uses the Internet service and a geographical location of the user when the user uses the Internet service; and calculating the carbon-saving quantity associated with the user based on the determined number of times that the user uses the Internet service, the determined geographical position of the user when the user uses the Internet service, and the first predefined algorithm.

A third feature, combinable with any of the previous or following features, wherein, when the second predefined algorithm is used to calculate the carbon-saving quantity, calculating a carbon-saving quantity associated with the user comprises: based on the behavior data, determining at least a number of walking steps or a walking distance of the user; and calculating the carbon-saving quantity associated with the user based on the determined number of walking steps or walking distance of the user and the second predefined algorithm.

A fourth feature, combinable with any of the previous or following features, wherein determining at least one predefined carbon-saving quantity quantization algorithm based on the identification information of the Internet service comprises determining at least one predefined carbon-saving quantity quantization algorithm based on the identification information of the Internet service and a plurality of pre-stored corresponding relationships between a plurality of Internet services and a plurality of carbon-saving quantity quantization algorithms.

A fifth feature, combinable with any of the previous or following features, wherein the Internet service comprises at least one of an electronic payment service, an online reservation service, an online ticketing service, an online bill payment service, and a health service.

A sixth feature, combinable with any of the previous or following features, wherein processing user data comprises: obtaining a plurality of carbon-saving quantities associated with the user corresponding to a plurality of Internet services within a predefined period; accumulating the obtained plurality of carbon-saving quantities; and processing the user data based on the accumulated carbon-saving quantity associated with the user.

A seventh feature, combinable with any of the previous or following features, wherein processing the user data based on the accumulated carbon-saving quantity associated with the user comprises: adding the accumulated carbon-saving quantity associated with the user and a total carbon-saving quantity associated with the user together to obtain an updated total carbon-saving quantity associated with the user; and processing the user data based on the updated total carbon-saving quantity associated with the user.

An eighth feature, combinable with any of the previous or following features, wherein adding the accumulated carbon-saving quantity associated with the user and a total carbon-saving quantity associated with the user together to obtain an updated total carbon-saving quantity associated with the user comprises: converting the accumulated carbon-saving quantity associated with the user into points based on a predefined conversion rule; and adding the converted points and total points of the user together to obtain updated total points of the user.

A ninth feature, combinable with any of the previous or following features, wherein a control component configured to accumulate points is provided to the user, and adding the converted points and total points of the user together to obtain updated total points of the user comprises: receiving an instruction sent by the user through the control component confirming points accumulation; and adding the converted points and the total points of the user together.

A tenth feature, combinable with any of the previous or following features, further comprising: receiving an instruction sent by the user to obtain non-accumulated points of other users; obtaining at least part of the non-accumulated points of other users in response to receiving the instruction sent by the user to obtain non-accumulated points of other users; and adding the obtained at least part of the non-accumulated points of other users and the updated total points of the user together to obtain second updated total points of the user.

An eleventh feature, combinable with any of the previous or following features, further comprising: determining the updated total points of the user; and based on the updated total points of the user, assigning, to the user, a virtual goods corresponding to the updated total points of the user.

A twelfth feature, combinable with any of the previous or following features, wherein the virtual goods has different display states corresponding to different total points.

In a third implementation, a computer-implemented system, comprising: one or more computers; and one or more computer memory devices interoperably coupled with the one or more computers and having tangible, non-transitory, machine-readable media storing instructions, that when executed by the one or more computers, perform operations comprising: obtaining behavior data associated with a user, wherein the behavior data is generated when the user uses an Internet service, and the behavior data comprises a user identification and identification information indicating the Internet service; determining at least one predefined carbon-saving quantity quantization algorithm based on the identification information of the Internet service; calculating a carbon-saving quantity associated with the user based on the obtained behavior data and the determined at least one predefined carbon-saving quantity quantization algorithm; and based on the calculated carbon-saving quantity associated with the user and the user identification, processing user data, wherein the user data is related to the carbon-saving quantity associated with the user.

The foregoing and other described implementations can each, optionally, include one or more of the following features:

A first feature, combinable with any of the following features, wherein the at least one predefined carbon-saving quantity quantization algorithm comprises: a first predefined algorithm, wherein the first predefined algorithm is a carbon-saving quantity quantization algorithm for targeting savings of paper products; and a second predefined algorithm, wherein the second predefined algorithm quantizes a carbon-saving quantity of reduction of trips by taking vehicles.

A second feature, combinable with any of the previous or following features, wherein, when the first predefined algorithm is used to calculate the carbon-saving quantity, calculating a carbon-saving quantity associated with the user comprises: based on the behavior data, determining at least a number of times that the user uses the Internet service and a geographical location of the user when the user uses the Internet service; and calculating the carbon-saving quantity associated with the user based on the determined number of times that the user uses the Internet service, the determined geographical position of the user when the user uses the Internet service, and the first predefined algorithm.

A third feature, combinable with any of the previous or following features, wherein, when the second predefined algorithm is used to calculate the carbon-saving quantity, calculating a carbon-saving quantity associated with the user comprises: based on the behavior data, determining at least a number of walking steps or a walking distance of the user; and calculating the carbon-saving quantity associated with the user based on the determined number of walking steps or walking distance of the user and the second predefined algorithm.

A fourth feature, combinable with any of the previous or following features, wherein determining at least one predefined carbon-saving quantity quantization algorithm based on the identification information of the Internet service comprises determining at least one predefined carbon-saving quantity quantization algorithm based on the identification information of the Internet service and a plurality of pre-stored corresponding relationships between a plurality of Internet services and a plurality of carbon-saving quantity quantization algorithms.

A fifth feature, combinable with any of the previous or following features, wherein the Internet service comprises at least one of an electronic payment service, an online reservation service, an online ticketing service, an online bill payment service, and a health service.

A sixth feature, combinable with any of the previous or following features, wherein processing user data comprises: obtaining a plurality of carbon-saving quantities associated with the user corresponding to a plurality of Internet services within a predefined period; accumulating the obtained plurality of carbon-saving quantities; and processing the user data based on the accumulated carbon-saving quantity associated with the user.

A seventh feature, combinable with any of the previous or following features, wherein processing the user data based on the accumulated carbon-saving quantity associated with the user comprises: adding the accumulated carbon-saving quantity associated with the user and a total carbon-saving quantity associated with the user together to obtain an updated total carbon-saving quantity associated with the user; and processing the user data based on the updated total carbon-saving quantity associated with the user.

An eighth feature, combinable with any of the previous or following features, wherein adding the accumulated carbon-saving quantity associated with the user and a total carbon-saving quantity associated with the user together to obtain an updated total carbon-saving quantity associated with the user comprises: converting the accumulated carbon-saving quantity associated with the user into points based on a predefined conversion rule; and adding the converted points and total points of the user together to obtain updated total points of the user.

A ninth feature, combinable with any of the previous or following features, wherein a control component configured to accumulate points is provided to the user, and adding the converted points and total points of the user together to obtain updated total points of the user comprises: receiving an instruction sent by the user through the control component confirming points accumulation; and adding the converted points and the total points of the user together.

A tenth feature, combinable with any of the previous or following features, further comprising: receiving an instruction sent by the user to obtain non-accumulated points of other users; obtaining at least part of the non-accumulated points of other users in response to receiving the instruction sent by the user to obtain non-accumulated points of other users; and adding the obtained at least part of the non-accumulated points of other users and the updated total points of the user together to obtain second updated total points of the user.

An eleventh feature, combinable with any of the previous or following features, further comprising: determining the updated total points of the user; and based on the updated total points of the user, assigning, to the user, a virtual goods corresponding to the updated total points of the user.

A twelfth feature, combinable with any of the previous or following features, wherein the virtual goods has different display states corresponding to different total points.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
acquiring fragmented behavior data of a user, wherein each fragment of the behavior data is generated if the user uses a respective on-line service, and wherein each fragment comprises identification information that identifies the respective on-line service corresponding to the behavior data;
determining, for each fragment of the behavior data, at least one preset carbon-saving quantity quantization algorithm according to the identification information of the on-line service;
calculating, for each fragment of the behavior data and using the determined related preset carbon-saving quantity quantization algorithm, a carbon-saving quantity of the user according to the fragment of the behavior data; and
providing, for output, a carbon-saving quantity of the user.

2. A non-transitory, computer-readable medium storing one or more instructions executable by a computer system to perform operations comprising:
acquiring fragmented behavior data of a user, wherein each fragment of the behavior data is generated if the user uses a respective on-line service, and wherein each fragment comprises identification information that identifies the respective on-line service corresponding to the behavior data;
determining, for each fragment of the behavior data, at least one preset carbon-saving quantity quantization algorithm according to the identification information of the on-line service;
calculating, for each fragment of the behavior data and using the determined related preset carbon-saving quantity quantization algorithm, a carbon-saving quantity of the user according to the fragment of the behavior data; and
providing, for output, a carbon-saving quantity of the user.

3. A system comprising:
one or more computers; and
one or more computer memory devices interoperably coupled with the one or more computers and having tangible, non-transitory, machine-readable media storing one or more instructions that, when executed by the one or more computers, perform one or more operations comprising:
acquiring fragmented behavior data of a user, wherein each fragment of the behavior data is generated if the user uses a respective on-line service, and wherein each fragment comprises identification information that identifies the respective on-line service corresponding to the behavior data;
determining, for each fragment of the behavior data, at least one preset carbon-saving quantity quantization algorithm according to the identification information of the on-line service;
calculating, for each fragment of the behavior data and using the determined related preset carbon-saving quantity quantization algorithm, a carbon-saving quantity of the user according to the fragment of the behavior data; and
providing, for output, a carbon-saving quantity of the user.

4. The method of claim 1, wherein each fragment of the behavior data comprises a user identification that indicates a user identity.

5. The method of claim 1, wherein the at least one present carbon-saving quantity quantization algorithm comprises:
a first preset algorithm that corresponds to saving of paper products; and
a second preset algorithm that corresponds to reduction of trips by a vehicle.

6. The method of claim 5, wherein, when the first preset algorithm is used to calculate the carbon-saving quantity, calculating the carbon-saving quantity of the user according to a first of the fragments of the behavior data and the determined related preset carbon-saving quantity quantization algorithm comprises:
determining, according to the first fragment of the behavior data, a number of times that the user performs the on-line service, and a geographical position of the user when the user performs the on-line service; and
calculating the carbon-saving quantity of the user is based on the determined number of times that the user performs the on-line service, the determined geographical position, and the first preset algorithm.

7. The method of claim 5, wherein, when the second preset algorithm is used to calculate a carbon-saving quantity, calculating the carbon-saving quantity of the user according to a first of the fragments of the behavior data and the determined related preset carbon-saving quantity quantization algorithm comprises:
at least determining, according to the first fragment of the behavior data, a number of walking steps or a walking distance of the user; and
calculating the carbon-saving quantity of the user according to the determined number of walking steps or walking distance of the user and the second preset algorithm.

8. The method of claim 5, wherein determining the at least one preset related carbon-saving quantity quantization algorithm for each fragment of the behavior data according to the identification information of the on-line service comprises:
determining at least one related preset carbon-saving quantity quantization algorithm according to the identification information of the on-line service and a pre-stored corresponding relationship between on-line services and carbon-saving quantity quantization algorithms.

9. The computer-readable medium of claim 2, wherein the on-line service comprises:
at least one of an electronic payment service, an online reservation service, an online ticketing service, an online bill payment service, and a health service.

10. The computer-readable medium of claim 2, wherein each fragment of the behavior data comprises a user identification that indicates a user identity.

11. The computer-readable medium of claim 10, wherein the at least one present carbon-saving quantity quantization algorithm comprises:
a first preset algorithm that corresponds to saving of paper products; and
a second preset algorithm that corresponds to reduction of trips by a vehicle.

12. The computer-readable medium of claim 11, wherein, when the first preset algorithm is used to calculate the carbon-saving quantity, calculating the carbon-saving quantity of the user according to a first of the fragments of the behavior data and the determined related preset carbon-saving quantity quantization algorithm comprises:
- determining, according to the first fragment of the behavior data, a number of times that the user performs the on-line service, and a geographical position of the user when the user performs the on-line service; and
- calculating the carbon-saving quantity of the user is based on the determined number of times that the user performs the on-line service, the determined geographical position, and the first preset algorithm.

13. The computer-readable medium of claim 11, wherein, when the second preset algorithm is used to calculate a carbon-saving quantity, calculating the carbon-saving quantity of the user according to a first of the fragments of the behavior data and the determined related preset carbon-saving quantity quantization algorithm comprises:
- at least determining, according to the first fragment of the behavior data, a number of walking steps or a walking distance of the user; and
- calculating the carbon-saving quantity of the user according to the determined number of walking steps or walking distance of the user and the second preset algorithm.

14. The computer-readable medium of claim 11, wherein determining the at least one preset related carbon-saving quantity quantization algorithm for each fragment of the behavior data according to the identification information of the on-line service comprises:
- determining at least one related preset carbon-saving quantity quantization algorithm according to the identification information of the on-line service and a pre-stored corresponding relationship between on-line services and carbon-saving quantity quantization algorithms.

15. The computer-readable medium of claim 2, wherein the on-line service comprises:
- at least one of an electronic payment service, an online reservation service, an online ticketing service, an online bill payment service, and a health service.

16. The computer-readable medium of claim 2, wherein the on-line service comprises:
- at least one of an electronic payment service, an online reservation service, an online ticketing service, an online bill payment service, and a health service.

17. The system of claim 3, wherein each fragment of the behavior data comprises a user identification that indicates a user identity.

18. The system of claim 17, wherein the at least one present carbon-saving quantity quantization algorithm comprises:
- a first preset algorithm that corresponds to saving of paper products; and
- a second preset algorithm that corresponds to reduction of trips by a vehicle.

19. The system of claim 18, wherein, when the first preset algorithm is used to calculate the carbon-saving quantity, calculating the carbon-saving quantity of the user according to a first of the fragments of the behavior data and the determined related preset carbon-saving quantity quantization algorithm comprises:
- determining, according to the first fragment of the behavior data, a number of times that the user performs the on-line service, and a geographical position of the user when the user performs the on-line service; and
- calculating the carbon-saving quantity of the user is based on the determined number of times that the user performs the on-line service, the determined geographical position, and the first preset algorithm.

20. The system of claim 18, wherein, when the second preset algorithm is used to calculate a carbon-saving quantity, calculating the carbon-saving quantity of the user according to a first of the fragments of the behavior data and the determined related preset carbon-saving quantity quantization algorithm comprises:
- at least determining, according to the first fragment of the behavior data, a number of walking steps or a walking distance of the user; and
- calculating the carbon-saving quantity of the user according to the determined number of walking steps or walking distance of the user and the second preset algorithm.

21. The system of claim 18, wherein determining the at least one preset related carbon-saving quantity quantization algorithm for each fragment of the behavior data according to the identification information of the on-line service comprises:
- determining at least one related preset carbon-saving quantity quantization algorithm according to the identification information of the on-line service and a pre-stored corresponding relationship between on-line services and carbon-saving quantity quantization algorithms.

22. The system of claim 3, wherein the on-line service comprises:
- at least one of an electronic payment service, an online reservation service, an online ticketing service, an online bill payment service, and a health service.

* * * * *

UNITED STATES PATENT AND TRADEMARK OFFICE
CERTIFICATE OF CORRECTION

PATENT NO. : 11,392,476 B2
APPLICATION NO. : 15/684603
DATED : July 19, 2022
INVENTOR(S) : Huajing Jin et al.

It is certified that error appears in the above-identified patent and that said Letters Patent is hereby corrected as shown below:

On the Title Page

In Item (30) Column 1, Line 1, delete "2016 1 0717756" and insert -- 201610717756 --.

Signed and Sealed this
Twentieth Day of September, 2022

Katherine Kelly Vidal
*Director of the United States Patent and Trademark Office*